(12) United States Patent
Ohta

(10) Patent No.: US 9,092,079 B2
(45) Date of Patent: Jul. 28, 2015

(54) STORAGE MEDIUM HAVING INFORMATION PROCESSING PROGRAM STORED THEREON, INFORMATION PROCESSING APPARATUS, INFORMATION PROCESSING SYSTEM, AND INSTRUCTION DISTINGUISHING METHOD

(75) Inventor: Keizo Ohta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 264 days.

(21) Appl. No.: 13/423,542

(22) Filed: Mar. 19, 2012

(65) Prior Publication Data

US 2013/0166787 A1 Jun. 27, 2013

(30) Foreign Application Priority Data

Dec. 27, 2011 (JP) .................................. 2011-285510

(51) Int. Cl.
*G06F 3/00* (2006.01)
*G06F 3/038* (2013.01)
*G06F 3/0488* (2013.01)
*G06F 3/048* (2013.01)

(52) U.S. Cl.
CPC ............... *G06F 3/038* (2013.01); *G06F 3/048* (2013.01); *G06F 3/0488* (2013.01); *A63F 2300/1068* (2013.01); *A63F 2300/6045* (2013.01)

(58) Field of Classification Search
CPC ..... G06F 3/038; G06F 3/0338; G06F 3/0346; G06F 3/0354
See application file for complete search history.

(56) References Cited

U.S. PATENT DOCUMENTS

| 7,047,130 B2 * | 5/2006 | Watanabe et al. .............. 701/420 |
| 7,168,047 B1 * | 1/2007 | Huppi ............................. 715/784 |
| 2006/0010206 A1 * | 1/2006 | Apacible et al. ............... 709/205 |
| 2006/0040738 A1 * | 2/2006 | Okazaki et al. .................. 463/32 |
| 2008/0146328 A1 * | 6/2008 | Ishii et al. ......................... 463/31 |
| 2010/0073318 A1 * | 3/2010 | Hu et al. ........................ 345/174 |
| 2010/0117962 A1 | 5/2010 | Westerman et al. |
| 2010/0309117 A1 * | 12/2010 | Ohta ............................. 345/156 |
| 2011/0238368 A1 * | 9/2011 | Ohta ............................. 702/154 |
| 2012/0268293 A1 * | 10/2012 | Stahlin et al. ................. 340/901 |

(Continued)

FOREIGN PATENT DOCUMENTS

JP 9-244802 9/1997

OTHER PUBLICATIONS

"The Automatic Recognition of Gestures" by Dean Harris Rubine, Dec. 1991.*

(Continued)

*Primary Examiner* — Jing-yih Shyu
(74) *Attorney, Agent, or Firm* — Nixon & Vanderhye, P.C.

(57) ABSTRACT

An example of an information processing apparatus distinguishes whether there is an operation instruction or not in accordance with an operation made on an input device. First, an acquiring section acquires an input value based on the operation made on the input device. An operation instruction distinguishing section distinguishes whether there is an operation instruction or not provided by the operation made on the input device, such that the distinguishing result is different between when the input value is within a distinguishing range, which is a prescribed range, and when the input value is outside the distinguishing range. When the input value is changed in a direction of being away from a border of the distinguishing range, a range setting section changes a size of the distinguishing range such that the border approaches the post-change input value.

25 Claims, 20 Drawing Sheets

(56) References Cited

U.S. PATENT DOCUMENTS

2013/0011065 A1* 1/2013 Yoshida .................. 382/187
2013/0027298 A1* 1/2013 Ohta ...................... 345/157

OTHER PUBLICATIONS

"Hand Tracking, Finger Identification, and Chordic Manipulation on A Multi-Touch Surface" by Wayne Westerman, Spring 1999.*

"Combining Gestures and Direct Manipulation" by Dean Rubine, CHI '92, May 3-7, 1992.*

Bashir et al, "Object Trajectory-Based Activity Classification and Recognition Using Hidden Markov Models", Jul. 2007, IEEE Transactions on Image Processing, Vo. 16, No. 7, pp. 1912-1919.*

Lai, "Neural Calibration and Kalman Filter Position Estimation for Touch Panels", Sep. 2, 2004, IEEE, Proceedings of the 2004 IEEE International Conference on Control Applications, pp. 1491-1496.*

Nov. 30, 2012 Search Report for EP12159184.6, 6 pages.

* cited by examiner

STORAGE MEDIUM HAVING INFORMATION PROCESSING PROGRAM STORED THEREON, INFORMATION PROCESSING APPARATUS, INFORMATION PROCESSING SYSTEM, AND INSTRUCTION DISTINGUISHING METHOD

CROSS REFERENCE TO RELATED APPLICATION

The disclosure of Japanese Patent Application No. 2011-285510 filed on Dec. 27, 2011 is incorporated herein by reference.

FIELD

This specification discloses a storage medium having an information processing program stored thereon for distinguishing whether there is an operation instruction or not based on an analog input made on an input device, an information processing apparatus, an information processing system, and an instruction distinguishing method.

BACKGROUND AND SUMMARY

Conventionally, there is an input device which allows an analog input to be thereon, for example, an analog stick or the like. Conventionally, there is also a technology for making an on/off operation instruction using an input device which allows an analog input to be made thereon.

With such a method, a user may occasionally move the stick largely in order to switch between an on state and an off state. In such a case, the responsiveness to the on/off switching may be occasionally poor.

Accordingly, an object of this specification discloses a storage medium having an information processing program stored thereon by which, when an operation instruction is to be made by use of an input device, a state where there is an operation instruction can be switched to a state where there is no operation instruction, or vice versa, with high responsiveness, an information processing apparatus, an information processing system, and an instruction distinguishing method.

(1)

An example of a storage medium described in this specification is a non-transitory computer-readable storage medium having an information processing program stored thereon, the information processing program being executable by a computer of an information processing apparatus for distinguishing whether there is an operation instruction or not in accordance with an operation made on an input device. The information processing program allows the computer to act as an acquisition unit, an operation instruction distinguishing unit, and a range setting unit.

The acquisition unit acquires an input value based on the operation made on the input device. The operation instruction distinguishing unit distinguishes whether there is an operation instruction or not provided by the operation made on the input device, such that the distinguishing result is different between when the input value is within a distinguishing range, which is a prescribed range, and when the input value is outside the distinguishing range. When the input value is changed in a direction of being away from a border of the distinguishing range, the range setting unit changes a size of the distinguishing range such that the border approaches the post-change input value.

According to the structure of (1), when the input value becomes away from the border of the distinguishing range, the distinguishing range is changed to approach the input value. According to this, the distance between the input value and the distinguishing range becomes shorter, and therefore, the change amount (moving amount) of the input value usable for switching the state where there is an operation instruction to the state where there is no operation instruction, or vice versa, can be reduced. Namely, the user can easily switch the state where there is an operation instruction to the state where there is no operation instruction, or vice versa, by returning the input value slightly toward the border of the distinguishing range. In this manner, according to the structure of (1), when an operation instruction is made by use of the input device, the state where there is an operation instruction can be switched to the state where there is no operation instruction, or vice versa, with high responsiveness.

(2)

The range setting unit may set the distinguishing range to include a prescribed set range.

According to the structure of (2), in whichever manner the distinguishing range is changed in accordance with the input value, the prescribed set range is included in the distinguishing range. Therefore, the user can switch, without fail, the state where there in an operation instruction to the state where there is no operation instruction, by an operation of moving the input position to a position within the set range.

(3)

The set range may include an input value of a case where no operation is made on the input device.

According to the structure of (3), the input value of a case where no operation is made on the input device is set to be included in the set range. Therefore, the user can switch the state where there in an operation instruction to the state where there is no operation instruction, by not operating the input device (e.g., by putting his/her hand off from the stick).

(4)

The input device may include a movable member which is operable by a user and is put to a prescribed state in the case where no operation is made thereon. In this case, the acquisition unit acquires an input value which is determined by a position and/or posture of the movable member with respect to the prescribed state.

According to the structure of (4), an input unit which allows the user to make an operation input thereon by moving the movable member is used. Such an input device physically moves the movable member during the operation. Therefore, if the distinguishing range is fixed, the movable member may be moved largely from the state where it is distinguished that there is an operation instruction to the state where it is distinguished that there is no operation instruction. By contrast, according to the structure of (4), the distinguishing range is changed in accordance with the input value. Therefore, the distance by which the movable member of the above-described input device is moved for switching the state where there is an operation instruction to the state where there is no operation instruction, or vice versa, can be shortened. Namely, the user can easily switch the state where there is an operation instruction to the state where there is no operation instruction, or vice versa.

(5)

The acquisition unit may acquire a two-dimensional input value. In this case, the range setting unit sets a distinguishing range representing a two-dimensional area on a coordinate plane provided for representing the two-dimensional input value.

According to the structure of (5), even when the input value is two-dimensional, it can be distinguished whether or not the input value is included in the distinguishing range at once, with no need of executing the distinguishing processing for each of the components. Therefore, the distinguishing processing can be executed easily. In the case where the structure of (5) is combined with the structure of (13) described below, the instruction direction can be accurately calculated by use of a two-dimensional distinguishing range.

(6)

The range setting unit may set the distinguishing range as a circular area on the coordinate plane, the circular area being centered around a position of an input value of a case where no operation is made on the input device.

According to the structure of (6), the distinguishing range can be easily managed by use of the length of the radius. In addition, the processing of distinguishing whether or not the input value is included in the distinguishing range can be executed by comparing the distance from the position of the input value of a case where there is no operation made on the input device to the input value against the length of the radius of the distinguishing range, and thus the calculation for the distinguishing processing is simplified.

(7)

When a direction from the central position of the circular area to the position of the input value is changed larger than a prescribed angle, the range setting unit may change the distinguishing range to be reduced.

According to the structure of (7), when the direction from the central position of the circular area to the position of the input value (input direction) is largely changed, the distinguishing range is reduced. In the case where the input direction is largely changed, if the distinguishing range is not changed, the post-change input value is within the distinguishing range. As a result, it may be undesirably distinguished that there is no operation instruction. By contrast, according to the structure of (7), the distinguishing range is reduced in the above case. Therefore, such wrong distinguishing can be prevented, and it can be accurately distinguished whether there is an operation instruction or not.

(8)

When the input value is changed in a direction of being away from the border of the distinguishing range, the range setting unit may set the distinguishing range to be a circular area, a central position of which is moved in a direction in accordance with the direction of change of the input value.

According to the structure of (8), the distinguishing range is set such that the central position thereof is moved in a direction in accordance with the direction of change of the input value. According to this, the distinguishing range is enlarged mainly in such a direction. Therefore, in the other directions, the ratio of enlargement is small (see FIG. 13). In this case, when the input direction is largely changed, the possibility that the post-change input position is included in the distinguishing range is low. Therefore, according to the structure of (8), the possibility that, when the input direction is largely changed, the post-change input position is included in the distinguishing range and as a result, it is wrongly distinguished that there is no operation instruction can be alleviated.

(9)

The range setting unit may include a reference point setting unit and a range determination unit. The reference point setting unit sets a reference point such that when a position of the input value is changed in a direction of being away from the reference point, the reference point is changed to approach a position of the post-change input value. The range determination unit determines the distinguishing range such that the reference point is on the border thereof. Thus, the distinguishing range is set.

According to the structure of (9), the reference point is set in accordance with the input value, so as to be within a prescribed range from the input value. Accordingly, when the input direction is largely changed, the distinguishing range is reduced (see FIG. 16). Therefore, such a situation that it is distinguished that there is no operation instruction against the intention of the user can be prevented, and thus the operation instruction can be accurately distinguished.

(10)

When the input value is changed in a direction of approaching a position of the reference point, the range setting unit may maintain the position of the reference point.

According to the structure of (10), when the input value is changed in a direction of approaching the position of the reference point, the position of the reference point is not changed. Therefore, in this case, the distinguishing range is not changed, either. Thus, the user can switch, without fail, the state where there is an operation instruction to the state where there is no operation instruction, or vice versa, by operating the input value to approach the border.

(11)

When the input value is changed in a direction of being away from the border of the distinguishing range, the range setting unit may set the distinguishing range such that the border thereof is away from a position of the post-change input value by a prescribed distance.

According to the structure of (11), the distinguishing range can be easily controlled such that the border of the distinguishing range is located within a certain distance from the position of the input value. Namely, the user can switch, without fail, the state where there is an operation instruction to the state where there is no operation instruction, or vice versa, by moving the input value to approach the distinguishing range by at least the certain distance.

(12)

When the input value is changed in a direction of approaching the border of the distinguishing range, the range setting unit maintains the distinguishing range.

According to the structure of (12), when the input value is changed in a direction of approaching the border of the distinguishing range, the distinguishing range is not changed. Therefore, the user can switch, without fail, the state where there is an operation instruction to the state where there is no operation instruction, or vice versa, by operating the input value to approach the border of the distinguishing range.

(13)

The information processing program may allow the computer to act as a direction calculation unit. When it is distinguished by the operation instruction distinguishing unit that there is the operation instruction, the direction calculation unit calculates a direction of a position of the input value with respect to a prescribed reference position on the coordinate plane provided for representing a two-dimensional input value.

According to the structure of (13), the user can instruct a direction by use of the input device, and the responsiveness of the operation of instructing a direction by use of the input device can be improved.

(14)

When the input value outside the distinguishing range is changed in a direction of being away from the border of the distinguishing range, the range setting unit may set the distinguishing range to be enlarged.

According to the structure of (14), by the enlargement of the distinguishing range, the border of the distinguishing range is allowed to approach the input value. Owing to this, the user can easily provide a state where there is no operation instruction by returning the input value slightly toward the distinguishing range, and the responsiveness of switching the state where there is an operation instruction to the state where there is no operation instruction can be improved.

(15)

The range setting unit may set the distinguishing range such that an upper limit thereof is a range which is away from the border of a region of positions that the input value can assume by at least a prescribed distance.

According to the structure of (15), the distinguishing range does not become too large. Therefore, such a situation that it is distinguished that there is no operation instruction against the intention of the user can be prevented, and thus the operation instruction can be accurately distinguished.

(16)

When the input value within the distinguishing range is changed in a direction of being away from the border of the distinguishing range, the range setting unit may set the distinguishing range to be reduced.

According to the structure of (16), by the reduction of the distinguishing range, the border of the distinguishing range is allowed to approach the input value. Owing to this, the user can easily provide the state where there is an operation instruction by moving the input value to a position slightly outside the distinguishing range. Thus, the responsiveness of switching the state where there is no operation instruction to the state where there is an operation instruction can be improved. In the case where the structure of (14) is combined with the structure of (16), the border of the distinguishing range is allowed to approach the input value both when the input value is within the distinguishing range and when the input value is outside the distinguishing range. Owing to this, the responsiveness of switching the state where there is an operation instruction to the state where there is no operation instruction, or vice versa, can be improved.

(17)

The range setting unit may set the distinguishing range such that a lower limit thereof is a range which includes an input value of a case where no operation is made on the input device.

According to the structure of (17), the distinguishing range does not become too small. Therefore, such a situation that it is distinguished that there is an operation instruction against the intention of the user can be prevented, and thus the operation instruction can be accurately distinguished.

(18)

When the input value is within the distinguishing range, the operation instruction distinguishing unit may distinguish that there is no operation instruction; and when the input value is outside the distinguishing range, the operation instruction distinguishing unit may distinguish that there is an operation instruction.

According to the structure of (18), with an input device by which when there is no operation made thereon, the input value is a certain reference value, and when an operation is made thereon, the input value is away from the reference value, the state where there is an operation instruction can be switched to the state where there is no operation instruction, or vice versa, with high responsiveness.

In this specification, an information processing apparatus and an information processing system including units equivalent to the units realized by execution of the information processing program of (1) through (18) are disclosed. Also in this specification, an instruction distinguishing method (method for distinguishing whether there is an operation instruction or not) which is executable by (1) through (18) is disclosed.

According to the storage medium having the above-described information processing program stored thereon, the above-described information processing apparatus, the above-described information processing system, and the above-described instruction distinguishing method, the border of the distinguishing range, provided for distinguishing whether there is an operation instruction or not, is changed in accordance with the change of the input value so as to approach the input value. By such an arrangement, an operation instruction is made by use of the input device, the state where there is an operation instruction can be switched to the state where there is no operation instruction, or vice versa, with high responsiveness.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Structure of an Information Processing System]

Figure 1:
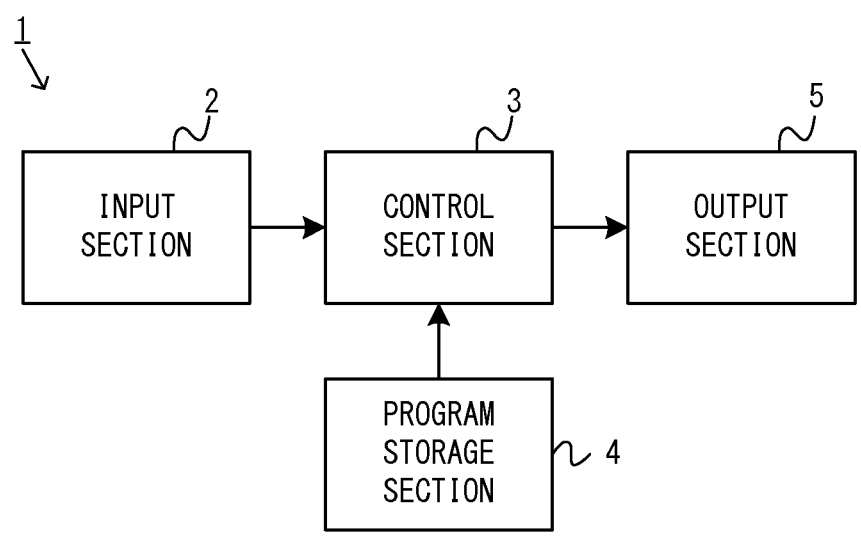
FIG. 1 is a block diagram showing a non-limiting example of an information processing system.

Hereinafter, an information processing program (and a storage medium having the same stored thereon), an information processing system (information processing apparatus), and an instruction distinguishing method according to an example of this example embodiment will be described. FIG. 1 is a block diagram showing an example of an information processing system according to this example embodiment. In FIG. 1, an information processing system 1 includes an input section 2, a control section 3, a program storage section 4, and an output section 5. The information processing system 1 may be formed of a single information processing apparatus (encompassing a mobile information processing apparatus) including the sections 2 through 5. Alternatively, the information processing system 1 may include an information processing apparatus including the control section 3, and at least one other apparatus including the sections other than the control section 3. The information processing system 1 makes a distinguishing on an operation instruction (distinguishes at least whether there is an operation instruction or not) in accordance with an operation made on the input section 2.

The input section 2 allows an analog input to be made thereon. Namely, the input section 2 allows a user to input an analog amount thereon, and is capable of sensing the input amount. Such an input device may be, for example, a slide pad or an analog switch for sensing an amount of operation on a stick section (movable member described later) as the analog amount, a touch panel or a touch pad for sensing a position of operation (touched position) as the analog amount, or the like. The input device may be capable of sensing the position and/or posture of an operation member held by the user.

In this example embodiment, the input section 2 includes the movable member which is operable by the user and is put to a prescribed state (referred to as the "reference state") when no operation is made (when the input section 2 is in a neutral state). Namely, the input section 2 allows the user to make an operation input thereon by moving the movable member. Such an input device may be, for example, a slide pad, an analog stick or the like.

The input section 2 outputs an input value based on the input made on the input section 2. The "input value" represents the result of the input made by the user (analog input). Even when the input made by the user is an analog input such as an amount of operation, a position of operation or the like, the input value itself may be either an analog value (analog data) or a digital value (digital data). In the case where, as in this example embodiment, the input section 2 is an input device including the movable member, the input value is determined by the position and/or posture of the movable member with respect to the reference state (change amount of the movable member from the reference state). In the case where, for example, the input section 2 is an input device having a slidable movable member (slide pad, etc.), the input value may be a digital value representing a slide amount and a slide direction of the movable member from the reference state.

The input value may be one-dimensional or two- or more dimensional. Specifically, the input section 2 may be an input device which allows a two-dimensional input to be made thereon, such as a slide pad, a touch panel or the like, or an input device which allows a one-dimensional input to be made thereon, such as a mouse wheel or the like. Alternatively, the input section 2 may be an input device which allows a three-dimensional input to be made thereon, such as an input device for sensing the position and/or posture of the operation member held by the user. The input section 2 may output the input value and also other input information. In the case where, for example, the input section 2 includes an input device which allows an analog input to be made thereon and also a button, the input section 2 may output input information representing an operation made on the button.

The control section 3 acquires the input value based on the input made on the input section 2. Based on the input value, the control section 3 distinguishes (determines) at least whether there is an operation instruction or not. The "operation instruction" is an instruction made by the user by use of the input section 2. Specifically, when "there is an operation instruction", it means that an instruction has been made by use of the input section 2. When "there is no operation instruction", there is no instruction made by use of the input section 2. As described in detail later, even in the case where an instruction has been made on the input section 2, the control section 3 may possibly distinguish that there is no operation instruction. The operation instruction may be any type of instruction in terms of the specific content thereof.

The control section 3 may have any structure as long as information processing for distinguishing whether there an operation instruction or not can be made based on the input value. In this example embodiment, the control section 3 is an information processing apparatus including a CPU and a memory. Specifically, the CPU executes a prescribed information processing program, and as a result, each of functions of the control section 3 is realized.

The program storage section 4 memorizes (stores) the information processing program. The program storage section 4 may be any type of storage device as long as being accessible by the control section 3. The program storage section 4 may be, for example, a storage device provided in the information processing apparatus including the control section 3, or a storage medium detachably mountable on the information processing apparatus including the control section 3. Alternatively, the program storage section 4 may be a storage device connectable to the control section 3 via a network (server, etc.). The control section 3 reads a part of, or the entirety of, the information processing program of the control section 3 at an appropriate timing, and the read information processing program is executed by the CPU.

The output section 5 outputs the result of the information processing executed by the control section 3. Specifically, the control section 3 outputs the result of the information processing based on the operation instruction to the output section 5, and the output section 5 outputs the result of the information processing in the form of an image, a sound or the like. The output section 5 may be a display device such as a TV, a monitor or the like, or an audio output device such as a speaker or the like.

[2. Overview of a Distinguishing Method on the Operation Instruction]

Now, with reference to FIG. 2 through FIG. 5, a distinguishing method on the operation instruction in this example embodiment will be described. In the following, a case where the input section 2 outputs a two-dimensional input value will be described. More specifically, the input section 2 is an input device having the movable member, and it is assumed that a two-dimensional input value corresponding to an operation of moving the movable member two-dimensionally is output. The operation instruction may be any type of instruction in terms of the specific content thereof. In the following, an instruction on a direction is made as the operation instruction. Specifically, the control section 3 distinguishes whether there is an operation instruction or not based on the input value, and when it is distinguished that there is an operation instruction, the control section 3 calculates the instructed direction (instruction direction).

Figure 2:
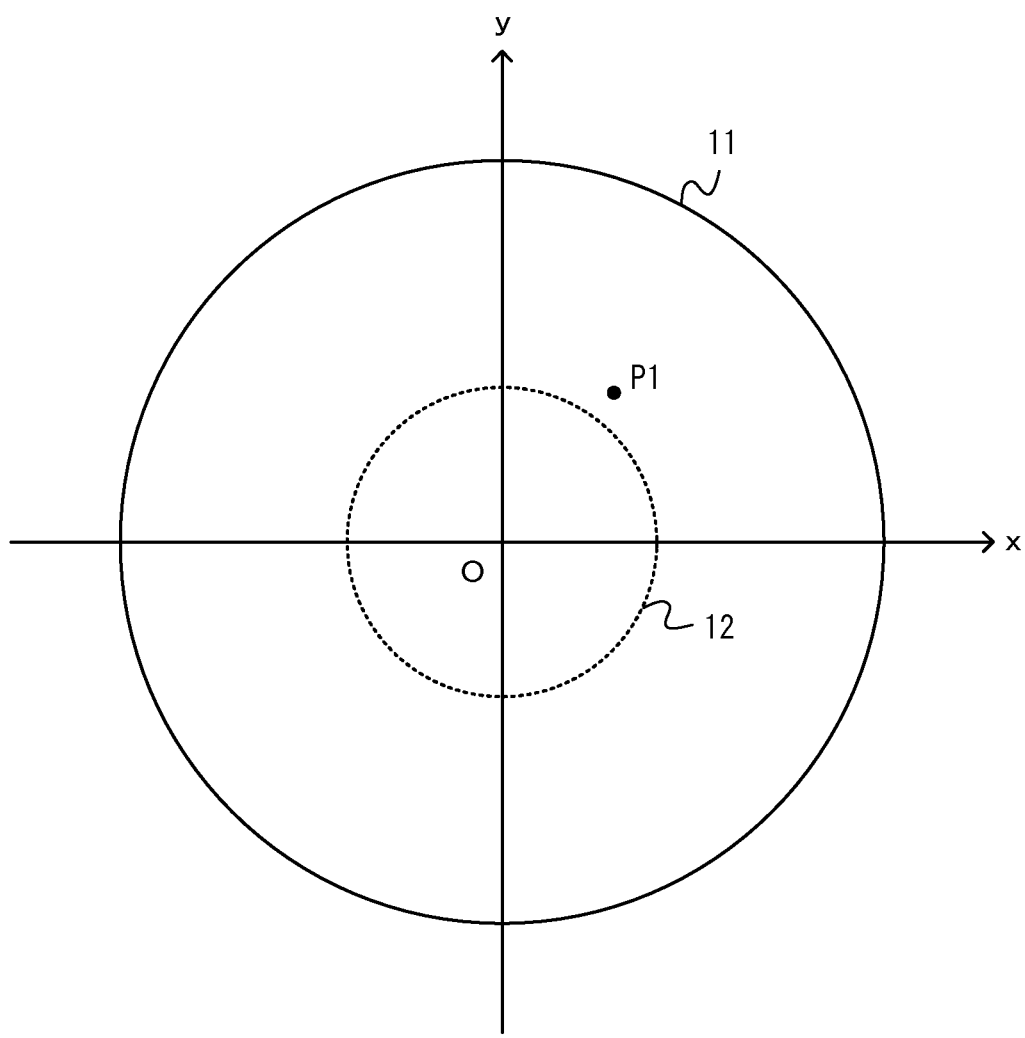
FIG. 2 shows a non-limiting example of a two-dimensional coordinate system (coordinate plane) provided for representing an input value in an example embodiment.

FIG. 2 shows an example of a two-dimensional coordinate system (coordinate plane) provided for representing an input section in this example embodiment. In this example, the horizontal axis of the two-dimensional coordinate system is the "x axis", and the vertical axis is the "y axis". An input position P1 is a position of the input value on the coordinate plane. An area 11 represents a range of positions that the input value can assume. The area 11 may have any shape which is determined by the type of the input device, and in this example embodiment, the area 11 is circular. In this example embodiment, the input value is a value of the origin O (0, 0) when no operation is made on the input section 2 (movable member) (i.e., in the reference state), and is a coordinate value representing the moving direction and the moving amount of the movable member from the reference state. Specifically, the direction of the input position P1 with respect to the origin O corresponds to the moving direction of the movable member from the reference state, and the distance from the origin O to the input position P1 corresponds to the moving amount of the movable member from the reference state.

A distinguishing range 12 is provided for distinguishing whether there is an operation instruction or not. Specifically, the control section 3 distinguishes whether there is an operation instruction or not, such that the distinguishing result is different between when the input value is within the distinguishing range and when the input value is outside the distinguishing range. In this example embodiment, when the input value is within the distinguishing range 12, the control section 3 distinguishes that there is no operation instruction; and when the input value is outside the distinguishing range 12, the control section 3 distinguishes that there is an operation instruction. For example, in FIG. 2, the input position P1 is outside the distinguishing range 12, and therefore the control section 3 distinguishes that there is an operation instruction. In other example embodiments, when the input value is outside the distinguishing range, the control section 3 may distinguish that there is no operation instruction; and when the input value is within the distinguishing range, the control section 3 may distinguish that there is an operation instruction. The distinguishing range 12 may be of any shape, for example, square, elliptical or the like, and in this example embodiment, the distinguishing range 12 is a circular area. In FIG. 2, the distance from the input position P1 to a border of the distinguishing range 12 is shorter than a prescribed distance L1 described later.

Figure 3:
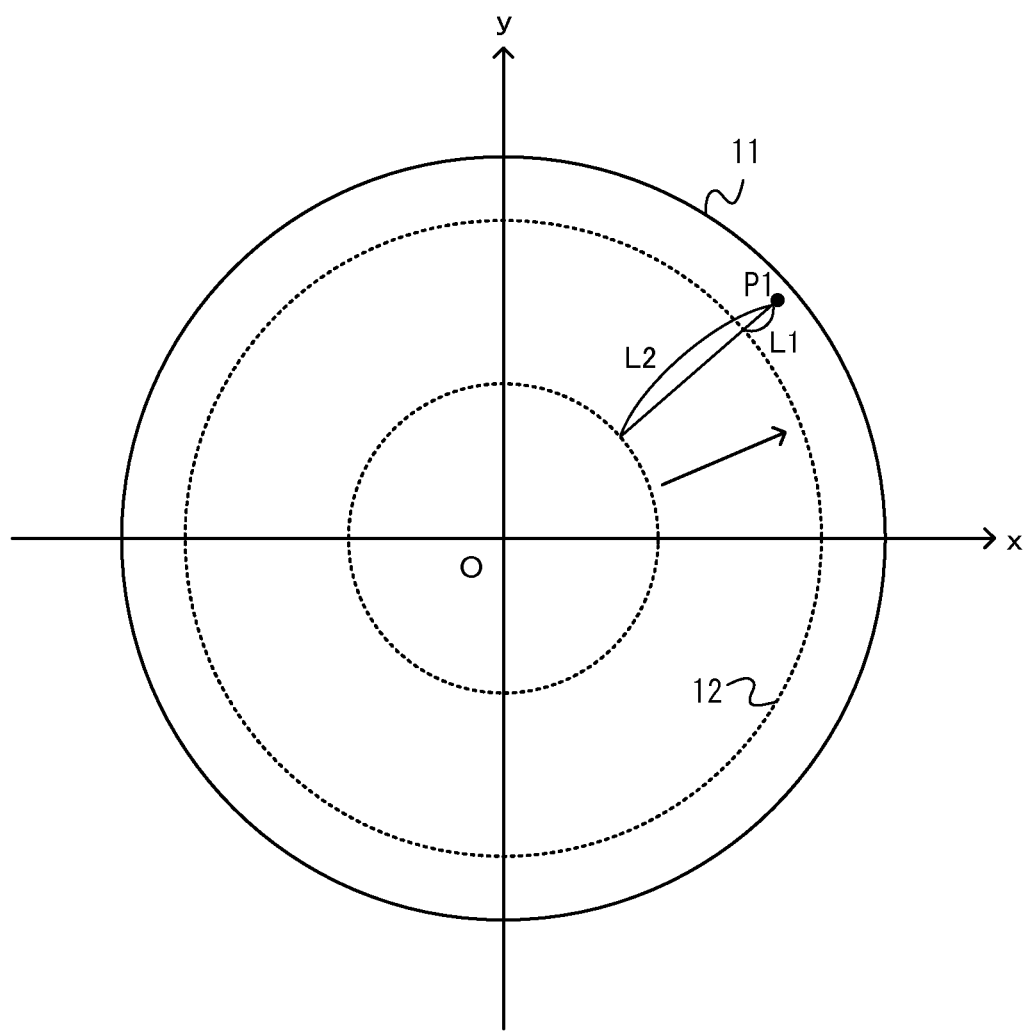
FIG. 3 shows a non-limiting example of the coordinate plane in the case where an input position P1 is changed from the position shown in FIG. 2 in a direction of being away from a border of a distinguishing range 12.

In this example embodiment, when the input value is changed in the direction of being away from the border of the distinguishing range 12, the control section 3 changes the size of the distinguishing range 12 such that the border approaches the post-change input value. FIG. 3 shows an example of the coordinate plane in the case where the input position P1 is changed from the position in FIG. 2 in a direction of being away from the border of the distinguishing range 12. The input position P1, which was outside the distinguishing range 12, is, in FIG. 3, still outer and away from the border of the distinguishing range 12. In this case, the size of the distinguishing range 12 is changed such that the border approaches the input position P1 (see FIG. 3).

The size of the distinguishing range 12 may be changed by any specific method. As shown in FIG. 3, the size of the distinguishing range 12 may be changed concentrically without the central position thereof being changed; or as in a modification described later, the distinguishing range 12 may be set such that the central position thereof is moved in a direction in accordance with the change of the input position. The distinguishing range 12 may be set to be within a prescribed distance from the input position, or as in a modification described later, may be set based on a reference point which is set to be within a prescribed distance from the input position.

In this example embodiment, the distinguishing range 12 is set such that the distance from the input position to the border is within the prescribed distance L1. Specifically, when the input position is changed in a direction of being away from the border of the distinguishing range 12, the control section 3 sets the distinguishing range 12 such that the border is away from the post-change input position by the prescribed distance L1. For example, when, as shown in FIG. 3, the distance from the post-change input position P1 to the border is L2 (longer than L1), the size of the distinguishing range 12 is changed such that the distance is equal to the prescribed distance L1. Owing to this, the distinguishing range 12 can be controlled such that the border is within a prescribed distance from the input position P1.

Figure 4:
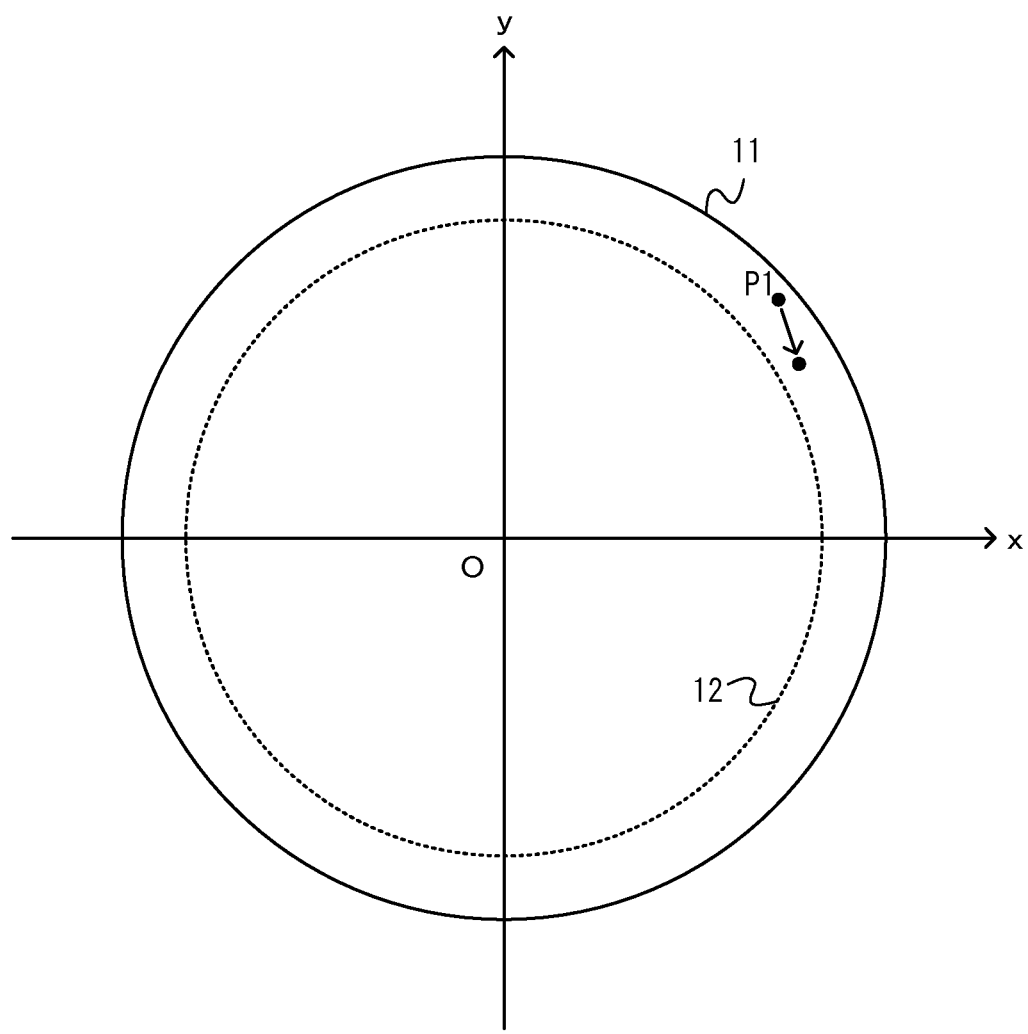
FIG. 4 shows a non-limiting example of the coordinate plane in the case where the input position P1 is changed from the position shown in FIG. 3 in a direction of approaching the border of the distinguishing range 12.

FIG. 4 shows an example of the coordinate plane in the case where the input position P1 is changed in a direction from the position in FIG. 3 in a direction of approaching the border of the distinguishing range 12. In this example embodiment, when the input position P1 is changed, as shown in FIG. 4, in a direction of approaching the border of the distinguishing range 12, the control section 3 maintains the distinguishing range 12. Namely, in this case, the distinguishing range 12 is not changed. Owing to this, when the input position P1 keeps on approaching the border, the input position P1 goes across the border, and thus the state where there is an operation instruction can be switched to the state where there is no operation instruction, or vice versa.

Figure 5:
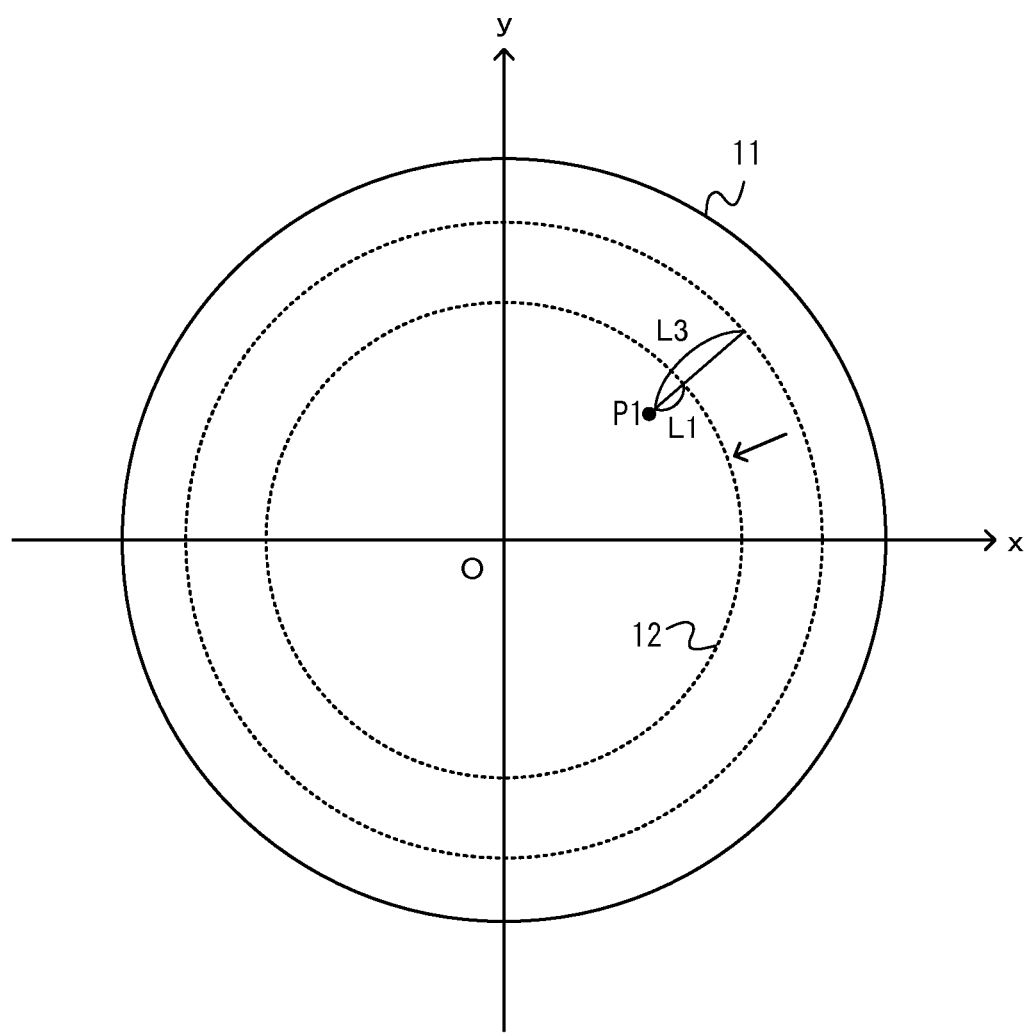
FIG. 5 shows a non-limiting example of the coordinate plane in the case where the input position P1 is changed from the position shown in FIG. 3 in a direction of going across the border of the distinguishing range 12 and being away from the border in the distinguishing range 12.

The distinguishing range 12 may be changeable in a direction of enlarging, changeable in a direction of reducing, or changeable in both directions. In this example embodiment, the control section 3 changes the distinguishing range 12 in both of the direction in which the distinguishing range 12 is enlarged and the direction in which the distinguishing range 12 is reduced. Specifically, when the input value outside the distinguishing range 12 is changed in a direction of being away from the border of the distinguishing range 12, the control section 3 sets the distinguishing range to be enlarged (see FIG. 3). When the input value within the distinguishing range 12 is changed in a direction of being away from the border of the distinguishing range 12, the control section 3 sets the distinguishing range 12 to be reduced. FIG. 5 shows an example of the coordinate plane in the case where the input position P1 is changed from the position shown in FIG. 3 to go across the border and is further changed in the distinguishing range 12 in a direction of being away from the border. In FIG. 5, the input position P1 enters the distinguishing range 12 and is further changed in a direction of being away from the border of the distinguishing range, and as a result, a distance L3 from the input position P1 in the distinguishing range 12 to the border is longer than the prescribed distance L1. In this case, the distinguishing range 12 is changed to be reduced (such that the distance from the input position to the border is equal to the prescribed distance L1). Specifically, in the case shown in FIG. 5, like in the case shown in FIG. 3, the size of the distinguishing range 12 is changed such that the border of the distinguishing range 12 approaches the post-change input position P1. In other embodiments, the control section 3 may change the distinguishing range 12 only in one of the direction in which the range is enlarged and the direction in which the range is reduced.

As described above, in this example embodiment, when the input value moves away from the border of the distinguishing range 12, the distinguishing range 12 is changed to approach the input value. According to this, the user can easily change the input value from a position outside the distinguishing range 12 to a position inside the distinguishing range 12 (or from a position inside the distinguishing range 12 to a position outside the distinguishing range 12). For example, in the case shown in FIG. 3, as the input position P1 moves, the distinguishing range 12 is enlarged. In the case shown in FIG. 5, as the input position P1 moves, the distinguishing range 12 is reduced. In either case, the user can move the input position P1 to a position inside the distinguishing range 12 by merely moving the input position P1 by at least the distance L1. Accordingly, the user can easily provide a state where there is no operation instruction by merely returning the movable member slightly from the state shown in FIG. 3 toward the reference state. The user can easily provide a state where there is an operation instruction by merely moving the movable member slightly from the state shown in FIG. 5 in a direction of being away from the reference state. In this manner, in this example embodiment, the responsiveness of switching the state where there is an operation instruction and the state where there is no operation instruction, or vice versa, can be improved by changing the distinguishing range 12 to the input value.

[3. Details of the Processing in the Information Processing System]

Figure 6:
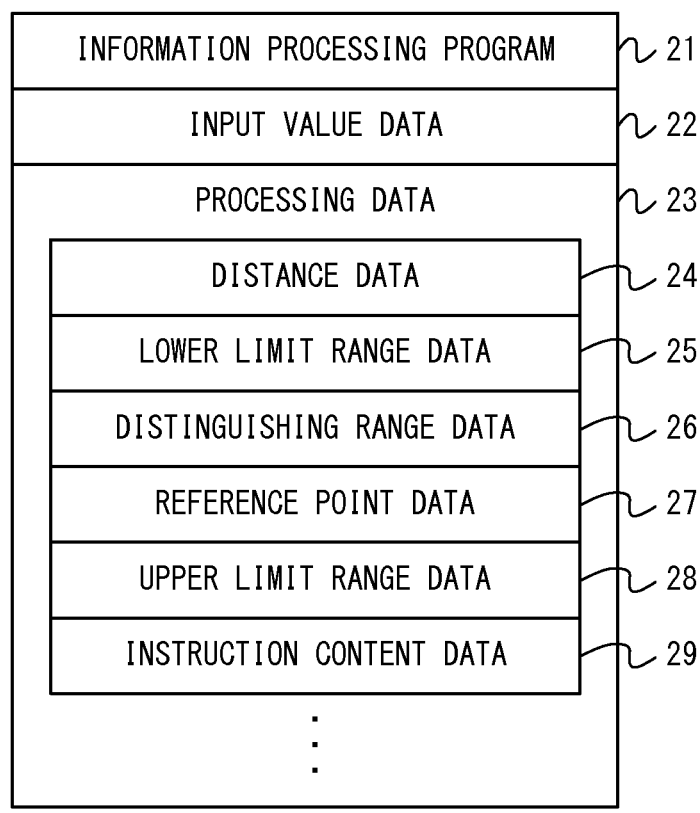
FIG. 6 shows a non-limiting example of data stored on a memory of a control section 3.

Hereinafter, with reference to FIG. 6 through FIG. 12, an example of detailed information processing executed by the information processing system 1 will be described. First, various types of data usable for the information processing will be described. FIG. 6 shows an example of data stored on a memory of the control section 3. As shown in FIG. 6, on the memory of the control section 3, an information processing program 21, input value data 22, and data for processing 23 (processing data 23) are stored. On the memory, the data shown in FIG. 6, and also data usable for various types of information processing executed by the control section 3, data for generating images and/or sounds to be output from the output section 5 (image data or sound data) or the like may be stored.

The information processing program 21 is to be executed by the CPU of the control section 3. In this example embodiment, the CPU executes the information processing program 21, and as a result, information processing described later (FIG. 7) is executed. The information processing program 21 may be provided as a part of an arbitrary application program (e.g., game program). The information processing program 21 is partially or entirely read from the program storage section 4 and stored on the memory of the control section 3 at an appropriate timing, and then executed by the CPU. A part of, or the entirety of, the information processing program 21 may be pre-stored (e.g., as a library) in the information processing apparatus including the control section 3.

The input value data 22 represents the above-described input value. The control section 3 acquires the input value data 22 from the input section 2. The input value data 22 may be acquired at any timing. In this example embodiment, the input section 2 repeatedly senses the result of an analog input made by the user to generate an input value, and the control section 3 acquires the input value data 22 from the input section 2 repeatedly (e.g., once in a prescribed time duration).

Figure 7:
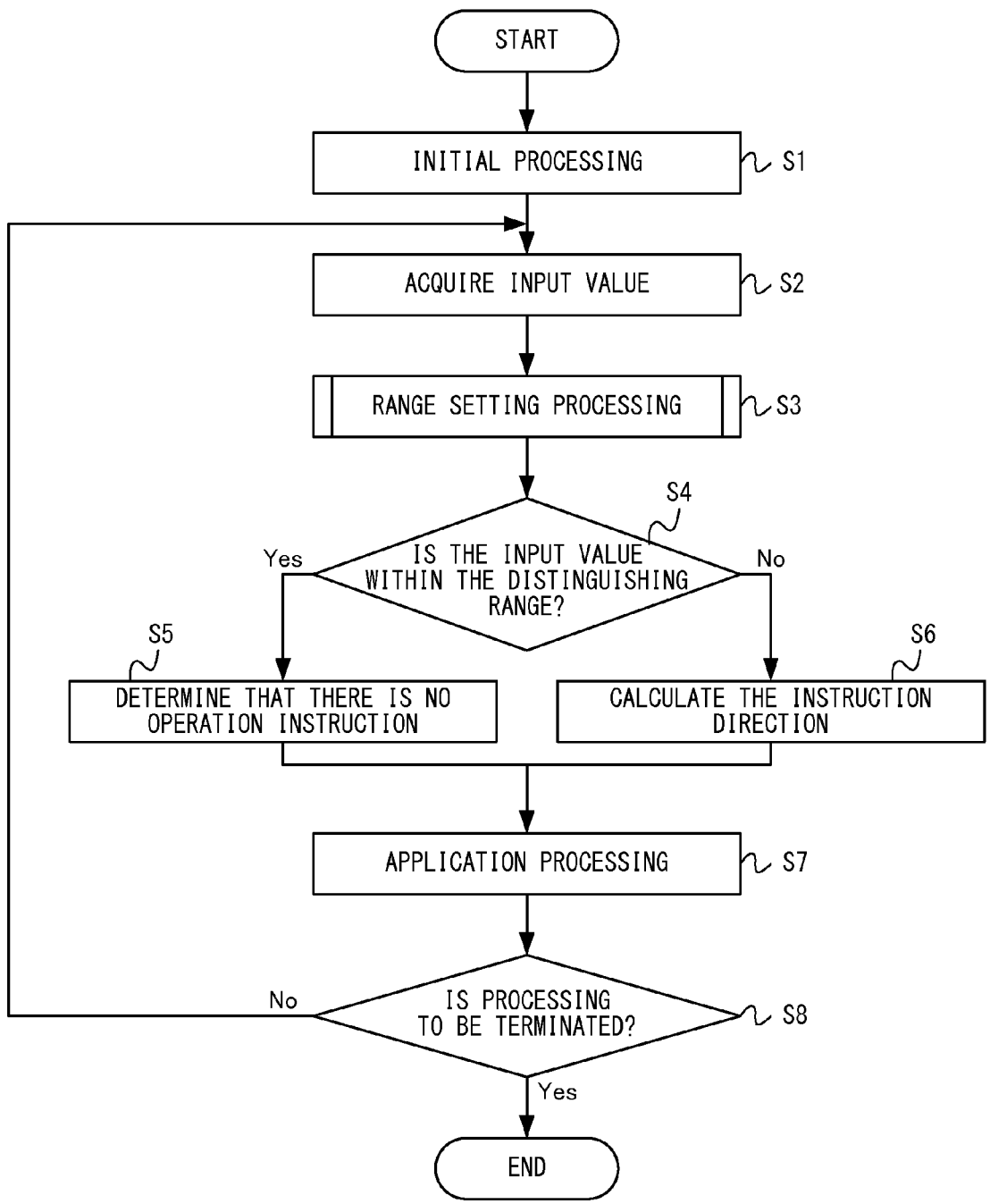
FIG. 7 is a main flowchart showing a non-limiting example of a flow of information processing executed by the control section 3.

The processing data 23 is used for the information processing executed by the control section 3 (FIG. 7). The processing data 23 includes distance data 24, lower limit range data 25, distinguishing range data 26, reference point data 27, upper limit range data 28, and instruction content data 29. The processing data 23 may include the data shown in FIG. 6 and also various types of data used for the information processing shown in FIG. 7.

The distance data 24 represents a distance from the input value (input position) to the distinguishing range (border of the distinguishing range) on the coordinate plane provided for representing the input value. The "distance from the input value to the distinguishing range" may be defined based on any reference. For example, the "distance from the input value to the distinguishing range" may be the shortest distance from the input position to the distinguishing range, or a distance from the intersection of a straight line extending from the input position toward the origin and the border of the distinguishing range to the input position. Alternatively, in the case where a reference point described below is set, the distance from the input value to the distinguishing range may be a distance from the input position to the position of the reference point.

The lower limit range data 25 represents a prescribed lower limit range, which indicates a lower limit of the distinguishing range. The lower limit range is predefined on the coordinate plane provided for representing the input value. The lower limit range data 25 may be acquired by any method. In this example embodiment, the lower limit range data 25 is stored together with the information processing program 21 in the program storage section 4, and is read and stored on the memory of the control section 3 together with the information processing program 21 at an appropriate timing.

The distinguishing range data 26 represents the above-described distinguishing range. The distinguishing range data 26 may represent any type of information which represents the distinguishing range. In the case where, for example, the distinguishing range is a circular area, the distinguishing range data 26 may represent the central position and the radius of the distinguishing range. In this example embodiment, the distinguishing range is a circular area centered around the origin. Therefore, data representing the radius of the distinguishing range is used as the distinguishing range data 26.

The reference point data 27 represents the position of the reference point described later. As described later in detail, the position of the reference point is calculated based on the input value. In the case where, as in this example embodiment, the distinguishing range is set with no use of the reference point, the reference point data 27 does not need to be stored on the memory.

The upper limit range data 28 represents an upper limit range, which indicates an upper limit of the distinguishing range. In the case where the upper limit range is set, the distinguishing range is set so as not to exceed the upper limit range (such that the distinguishing range is included in the upper limit range). The upper limit range data 28 may be acquired by any method, and like the lower range data 25, may be read and stored on the memory of the control section 3 together with the information processing program 21 at an appropriate timing. In this example embodiment, the region 11 (see FIG. 2) of positions that the input value can assume has a limit, and the distinguishing range is set to be within the prescribed distance L1 from the input position. In this case, even when the upper limit range is not preset, the distinguishing range does not exceed a certain size. Therefore, in this example embodiment, the upper limit range data 28 does not need to be stored on the memory.

The instruction content data 29 represents the content of the instruction provided by the user by an instruction made on the input section 2 (instruction content). The instruction content may be of any type. In this example embodiment, when it is distinguished that there is an operation instruction, information representing a direction based on the input value (instruction direction) is calculated as the instruction content.

Now, details of the information processing executed by the control section 3 will be described with reference to FIG. 7 through FIG. 12. FIG. 7 is a main flowchart showing an example of a flow of the information processing executed by the control section 3. The control section 3 may start the above-described information processing at any timing, and, for example, may start the information processing when instructed by the user. For starting the execution of the information processing, the CPU of the controls section 3 initializes the memory and the like, and reads the information processing program from the program storage section 4 into the memory. Then, the execution of the information processing program 21 is started by the CPU. The flowchart shown in FIG. 7 shows the processing executed after the above-described processing is finished.

Figure 8:
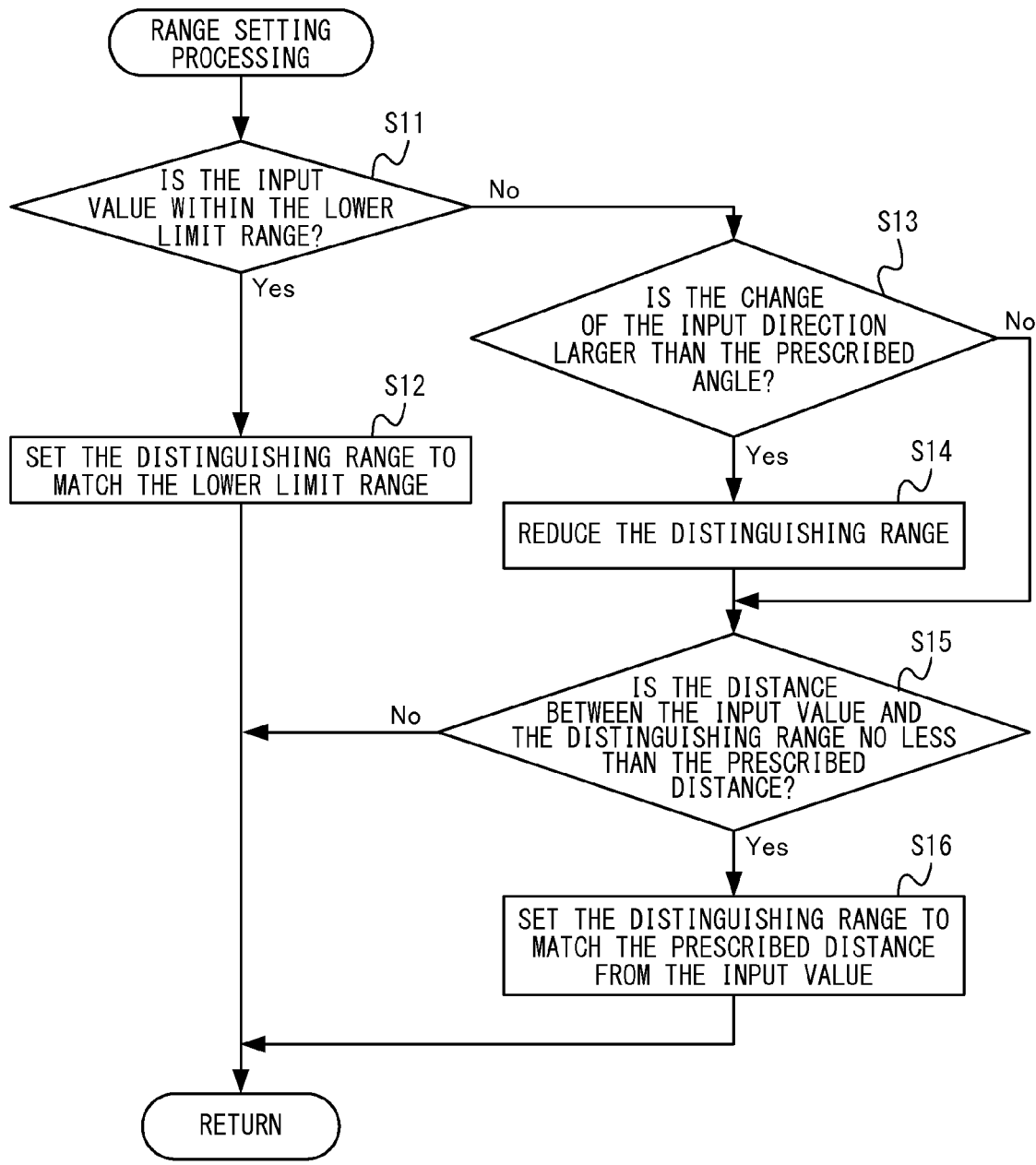
FIG. 8 is a flowchart showing a non-limiting example of a detailed flow of range setting processing shown in FIG. 7 (step S2)
Figure 17:
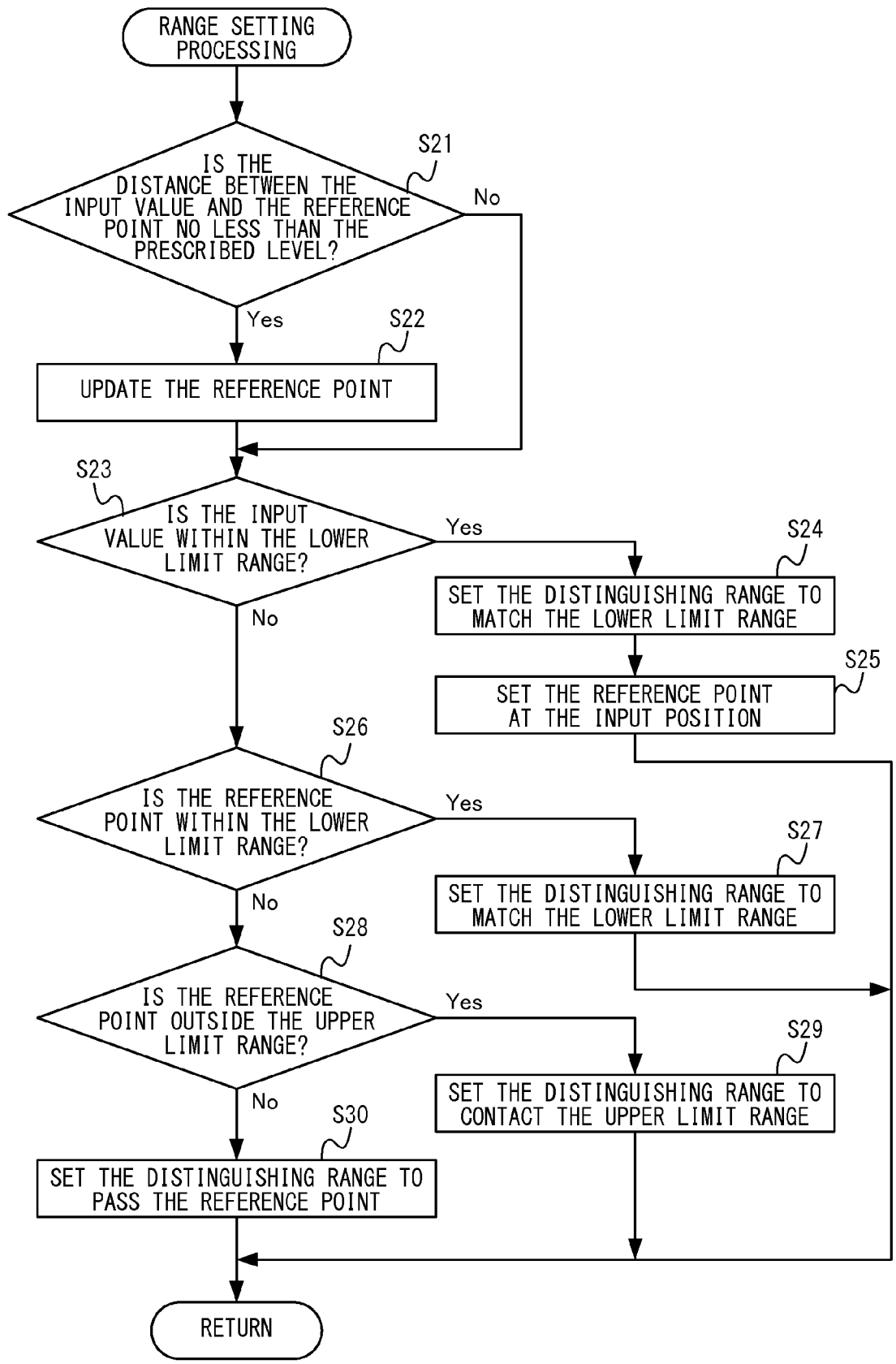
FIG. 17 is a flowchart showing a non-limiting example of range setting processing in a modification.

Processing of each of steps in the flowcharts shown in FIG. 7, FIG. 8 and FIG. 17 is merely an example, and the order of the processing of the steps may be changed as long as substantially the same results are obtained. The values of the variants and the threshold values used in determination steps are merely an example, and any other value may be optionally adopted. In this example embodiment, the processing of each of the steps in the flowcharts will be described as being executed by the CPU, but the processing of a part of the steps in the flowcharts may be executed by a processor other than the CPU or a dedicated circuit.

In step S1, initial processing is executed. The initial processing is, for example, processing of setting initial values of various parameters used in the processing of step S2 or later. In this example embodiment, the lower limit range 25 representing a predefined range is stored on the memory of the control section 3. As the initial value of the distinguishing range data 26, data representing the same range as the lower limit range is stored on the memory.

After step S1, processing of step S2 is executed. After this, a processing loop including a series of processing of steps S2 through S8 is executed repeatedly at a rate of once in a prescribed time duration.

In step S2, the CPU acquires the input value from the input section 2. Specifically, the CPU acquires data representing the input value which is output from the input section 2 and stores the data on the memory as the input value data 22. On the memory, a prescribed number of pieces of input value data may be stored sequentially from the latest data (the last data acquired so far). After step S2, processing of step S3 is executed.

In step S3, the CPU executes range setting processing. The range setting processing is processing of setting the distinguishing range such that the distinguishing range changes in accordance with the input value. Hereinafter, with reference to FIG. 8, details of the range setting processing will be described.

FIG. 8 is a flowchart showing an example of the details of the flow of the range setting processing (step S3). In this example embodiment, the distinguishing range is set with the above-described lower limit range being the lower limit. Specifically, in steps S11 and S12, when the input value is within the lower limit range, the distinguishing range is set to match the lower limit range. Hereinafter, details of processing of steps S11 and S12 will be described.

In step S11, the CPU determines whether or not the input value is within the lower limit range. The lower limit range may be set in any manner. In this example embodiment, the lower limit range is set to include the origin, and more specifically, the lower limit range is set as a circular area centered around the origin (see FIG. 9). The lower limit range may be set based on characteristics regarding the mechanism of the movable member of the input device. For example, for the input device such as a slide pad, an analog stick or the like, a so-called "play range", namely, an input value range in which it should be determined that no operation is made on the movable member, may be set (recommended). The lower limit range may be set based on the play range, which is set on the mechanism of the movable member. Alternatively, the lower limit range may be set to a different range in accordance with the type of application using an operation instruction based on the input value, or the content of the operation in such an application. In this example embodiment, the lower limit range is constant and fixed, but in other embodiments, the lower limit range may be changed in accordance with a prescribed state. For example, the lower limit range may be changed when the type of operation using the input section 2 is changed (e.g., when the target of operation is changed). Alternatively, the lower limit range may be settable by the user.

Specifically, the CPU reads the input value data 22 and the lower limit range data 25 from the memory, and determines whether or not the input value is included in the lower limit range. When the determination result of step S11 is positive, the processing of step S12 is executed. When the determination result of step S11 is negative, processing of step S13 is executed.

In step S12, the CPU sets a distinguishing range matching the lower limit range. Specifically, data representing a range matching the lower limit range is stored on a memory as the distinguishing range data 26. More specifically, data representing a length equal to the radius of the lower limit range is stored on the memory as the distinguishing range data 26. After step S12, the CPU finishes the range setting processing.

Figure 9:
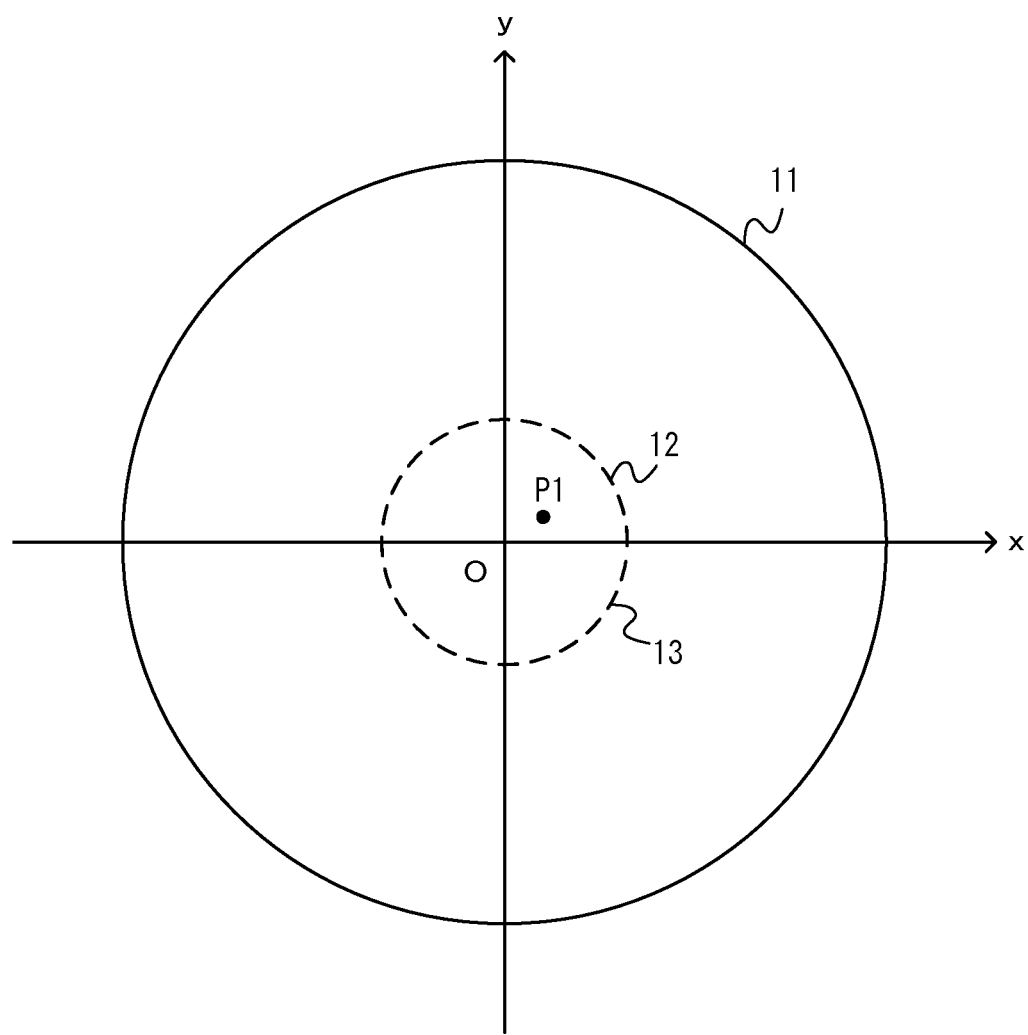
FIG. 9 shows a non-limiting example of the coordinate plane in the case where the input value is included in a lower limit range.

FIG. 9 shows an example of the coordinate plane in the case where the input value is included in the lower limit range. As described above regarding steps S11 and S12, the CPU sets the distinguishing range with the above-described lower limit range being the lower limit. Therefore, in the case where, as shown in FIG. 9, the input position P1 is included in the lower limit range, the lower limit range (represented by reference numeral 13) is the distinguishing range 12 (the distinguishing range 12 matches the lower limit range 13) regardless of the distance from the input position P1 to the distinguishing range 12. When, as in this example embodiment, the distinguishing range is changed to be reduced, there is an undesirable possibility that the distinguishing range becomes too small and as a result, the operation of providing the state where there is no operation instruction becomes difficult. By contrast, in this example embodiment, the distinguishing range does not become too small, and thus the user can easily provide the state where there is no operation instruction.

According to steps S11 and S12, even in the case where the border of the distinguishing range has been outside the lower limit range, when the input value becomes within the lower limit range, the distinguishing range is set to match the lower limit range. Now, it is assumed that in the processing loop (processing loop of steps S2 through S8) to be executed immediately subsequently, the input position is moved to a position slightly outside the lower limit range. In this case, if the border of the distinguishing range is outside the lower limit range, there is an undesirable possibility that the input value is located within the distinguishing range and as a result, it is determined that there is no operation instruction. By contrast, in the example embodiment, the distinguishing range is set to match the lower limit range in the above case. Therefore, the input value is located outside the distinguishing range, and as a result, it is distinguished that there is an operation instruction. In this manner, when the input value is changed to a position outside the distinguishing range even slightly, it is determined that there is an operation input. Therefore, the responsiveness of switching the state where there is no operation instruction to the state where there is an operation instruction can be further improved.

Figure 10:
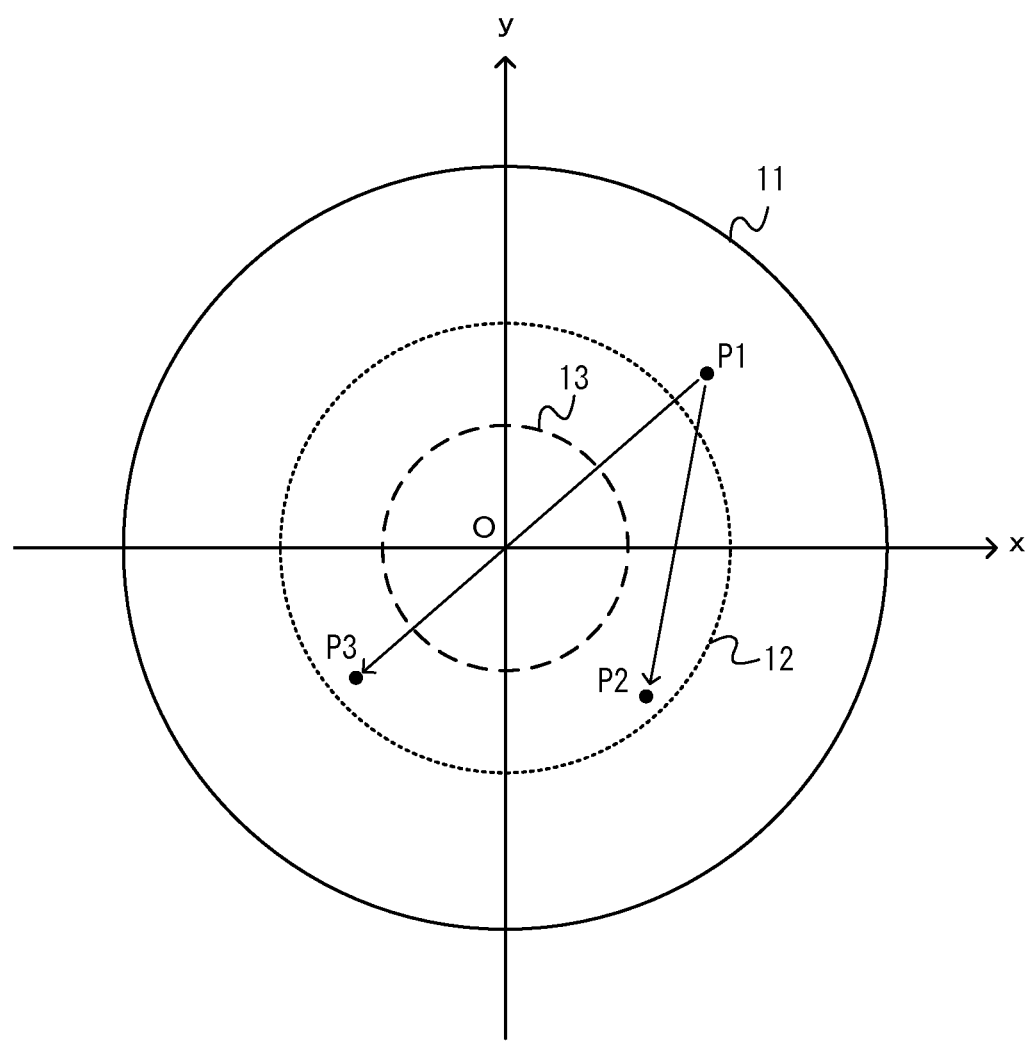
FIG. 10 shows a non-limiting example of the coordinate plane in the case where an input direction is changed.

In steps S13 and S14, when the input direction is changed by an angle larger than a prescribed angle, the distinguishing range is changed to be reduced. The "input direction" is a direction from the central position (origin) of the distinguishing range, which is a circular area, to the input value (input position). FIG. 10 shows an example of the coordinate plane in the case where the input direction is changed. FIG. 10 shows a case where the input position P1 is changed to an input position P2, and a case where the input position P1 is changed to an input position P3. When, as shown in FIG. 10, the input direction is largely changed (by an angle larger than the prescribed angle), it is estimated that the operation by the user has been made, not with an intention to switch to the state where there is no operation instruction, but with an intention to change the direction of instruction (instruction direction). However, in the case where, as shown in FIG. 10, the post-change input position P2 or P3 is within the distinguishing range 12, if the distinguishing range 12 is not changed, the input position P2 or P3 is within the distinguishing range. As a result, it is distinguished that there is no operation instruction. Hence, in this example embodiment, when the input direction is largely changed, the distinguishing range 12 is reduced (in FIG. 10, is set to match the lower limit range 13) to prevent the above-described wrong distinguishing. Hereinafter, details of the processing of steps S13 and S14 will be described.

In step S13, the CPU determines whether or not the change of the input direction is larger than the prescribed angle. Specifically, the CPU first reads the input value data 22 from the memory, and calculates the input direction. Data representing the calculated input direction is stored on the memory. Next, the CPU determines whether or not the angle of change of the input direction is no less than the prescribed angle. The angle of change of the input direction may be calculated by any method, and for example, is calculated as the angle of the input direction calculated in the current processing loop (steps S2 through S8) with respect to the input direction calculated in the immediately previous processing loop. The CPU determines whether or not the calculated angle of change is no less than the prescribed angle. In the case where the immediately previous input value is the position of the origin and thus the immediately previous input direction is not calculated, the CPU sets that the determination result is negative. When the determination result in step S13 is positive, processing of step S14 described later is executed. By contrast, when the determination result in step S13 is negative, the processing of step S14 is skipped and processing of step S15 described later is executed.

In step S14, the CPU changes the distinguishing range to be reduced. Specifically, the CPU reads the distinguishing range data 26 from the memory, and reduces the current distinguishing range. The distinguishing range may be reduced by any method, and in this example embodiment, is reduced to match the lower limit range. In other embodiments, the distinguishing range may be set as a range obtained by reducing the current distinguishing range by a prescribed size (or at a prescribed ratio). The CPU stores data representing the post-reduction distinguishing range on the memory as the new distinguishing range data 26. After this processing of step S14, the processing of step S15 is executed.

In steps S15 and S16, the size of the distinguishing range is changed in accordance with the change of the input value. Specifically, when the input value is changed in a direction of being away from the border of the distinguishing range, the CPU changes the size of the distinguishing range such that the border approaches the post-change input value. Hereinafter, details of the processing of steps S15 and S16 will be described.

In step S15, the CPU determines whether or not the distance between the input position and the distinguishing range is no less than the prescribed distance. Specifically, the CPU first calculates this distance. This distance may be calculated by any method, and in this embodiment, the shortest distance from the input position to the border of the distinguishing range is calculated as this distance. This shortest distance is calculated as a difference between the distance from the origin to the input position and the radius of the distinguishing range. Specifically, the CPU reads the input value data 22 and the distinguishing range data 26 from the memory, and calculates the distance between the input value and the distinguishing range based on the input value and the radius of the distinguishing range.

Next, the CPU determines whether or not the calculated distance is no less than the prescribed distance L1. In this example embodiment, data representing the prescribed distance L1 is pre-stored on the memory. Specifically, the CPU reads data representing the prescribed distance L1 from the memory, and makes the above determination by comparing the calculated distance against the prescribed distance L1. The prescribed distance L1 may be set to a different value in accordance with the type of application using an operation instruction based on the input value, or the content of the operation of such an application, like the lower limit range. The prescribed distance L1 may be changed in accordance with a prescribed state; for example, may be changed when the type of operation to be made by use of the input section 2 is changed. When the determination result of step S15 is positive, processing of step S16 is executed. When the determination result of step S15 is negative, the CPU terminates the range setting processing.

In step S16, the CPU sets the distinguishing range to match the prescribed distance from the input value. As described above, the position of the distinguishing range may be set in any manner. In this example embodiment, the control section 3 sets the distinguishing range as a circular area centered around the origin. Specifically, the position of the distinguishing range (central position of the distinguishing range) is the position of the origin. With such setting, the distinguishing range can be easily managed with only the length of the radius. In addition, the processing of distinguishing whether or not the input value is included in the distinguishing range (step S4 described later) can be executed by a comparison between the distance from the origin to the input value and the length of the radius of the distinguishing range, and thus the calculation for the distinguishing processing is simplified.

In the case where the distinguishing range is a circular area centered around the origin, the radius of the distinguishing range can be calculated as a length obtained by subtracting the prescribed distance L1 from the distance between the origin and the input position. Accordingly, specifically in step S16, the CPU reads data representing the prescribed length L1 and the input value data 22 from the memory, and calculates the radius of the distinguishing range based on the input value and the prescribed length L1. Data representing the calculated radius is stored on the memory as the distinguishing range data 26. After step S16, the CPU terminates the range setting processing.

Figure 11:
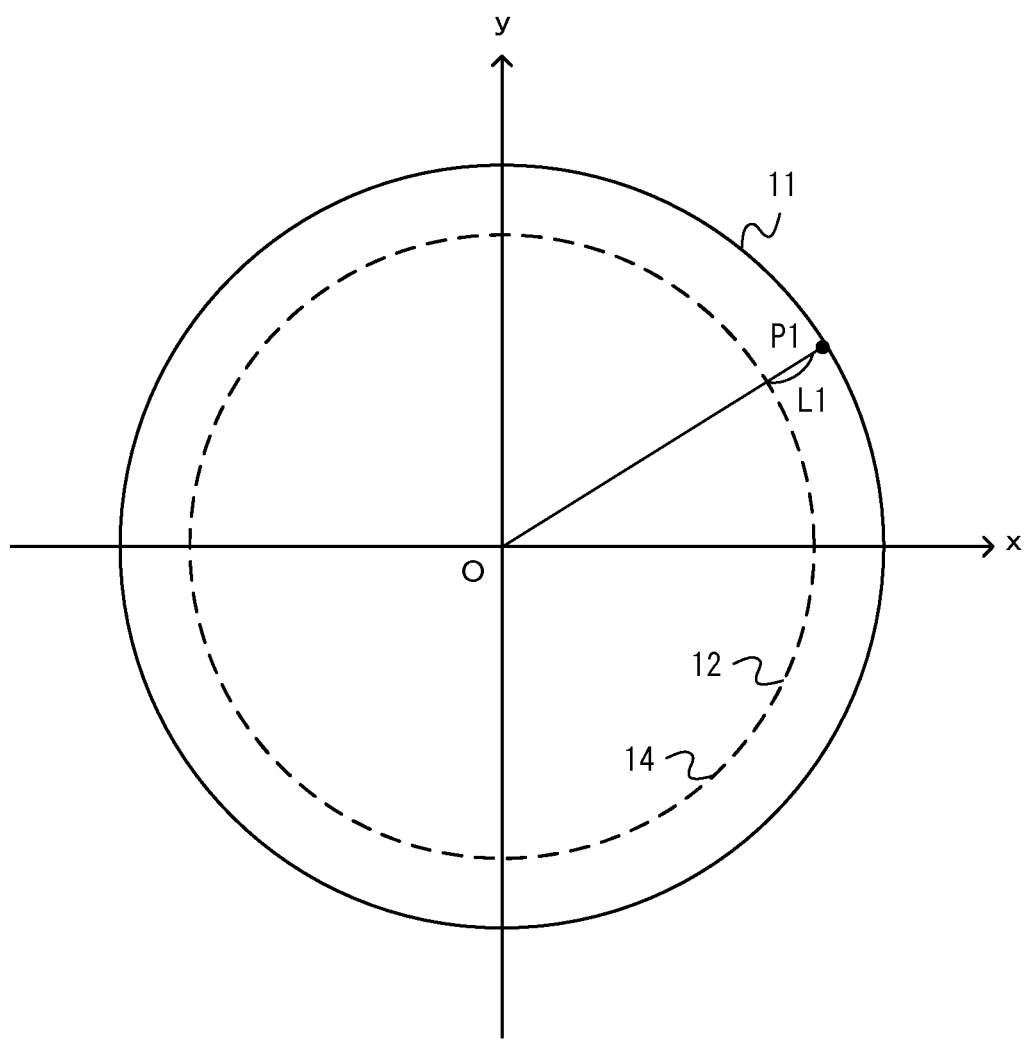
FIG. 11 shows a non-limiting example of the coordinate plane in the case where the input value is maximum.

FIG. 11 shows an example of the coordinate plane in the case where the input value is maximum. The "case where the input value is maximum" is the case where the distance from the origin to the input position is maximum as shown in FIG. 11 (the case where the input value is on the circumference of the range 11). In this case, in this example embodiment, as a result of the processing of step S16, the distinguishing range is set at a position inner (inner with respect to the origin) to the input position by the prescribed distance L1. In this example embodiment, whichever value the input value may take, the distinguishing range 12 does not become larger than the range in the above case; namely, the distinguishing range 12 is set to be the upper limit (maximum) range in the above case. As described above, in this example embodiment, the CPU sets the distinguishing range such that the upper limit is the range distanced by at least the prescribed distance L1 from the border of the range 11 of the positions that the input value can assume. When, as in this example embodiment, the distinguishing range is changed to be enlarged, if the distinguishing range becomes too large (e.g., if the distinguishing range is set to approximately match the range 11), the input value may undesirably become within the distinguishing range even when the input value is changed only slightly. As a result, there occurs a possibility that it is distinguished that there is no operation instruction against the intention of the user, and thus the operation instruction is not accurately distinguished. By contrast, in this example embodiment, the distinguishing range does not become too large. Therefore, such a situation that it is distinguished that there is no operation instruction against the intention of the user can be prevented, and thus the operation instruction can be accurately distinguished.

In the above-described range setting processing, the CPU sets the distinguishing range 12 to include a prescribed set range (lower limit range 13) (steps S12, S14 and S16). Namely, in whichever manner the distinguishing range 12 may change in accordance with the input value, the set range is always included in the distinguishing range 12. Accordingly, in this example embodiment, the user can switch, without fail, to the state where there is no operation instruction by moving the input position to a position within the set range. In this example embodiment, the set range is set to include an input value of the case where no operation is made on the input section 2 (is set to include the position of the origin). More specifically, the set range is a circular area centered around the input value. According to such setting, the user can put the input value to a value within the set range by not operating the movable member of the input section 2 (e.g., by putting his/her hand off from the movable member). Thus, the user can more easily switch to the state where there is no operation instruction.

When the distinguishing range is set by the above-described range setting processing (step S3), it is distinguished whether there is an operation instruction or not by use of the distinguishing range in steps S4 through S6 shown in FIG. 7. Specifically, when the input value is within the distinguishing range, the control section 3 distinguishes that there is no operation instruction provided by an input made on the input section 2; whereas when the input value is outside the distinguishing range, the control section 3 distinguishes that there is an operation instruction provided by an input made on the input section 2. Hereinafter, details of processing of steps S4 through S6 will be described.

In step S4, the CPU determines whether or not the input value is within the distinguishing range. Specifically, the CPU reads the input value data 22 and the distinguishing range data 26 from the memory, and determines whether or not the input value is included in the distinguishing range. In this example embodiment, the determination of step S4 can be made based on whether or not the distance from the origin to the input value is smaller than the radius of the distinguishing range. When the determination result of step S4 is positive, the processing of step S5 is executed. By contrast, when the determination result of step S4 is negative, the processing of step S6 is executed.

In step S5, the CPU distinguishes that there is no operation instruction. In step S5, prescribed processing may be executed when necessary, or may not be executed (the processing of step S5 does not need to be executed). When the prescribed processing is to be executed, the CPU may, for example, store data representing that there is no operation instruction on the memory as the instruction content data 29. After step S5, processing of step S7 is executed.

Meanwhile, in step S6, the CPU distinguishes that there is an operation instruction. In this case, the CPU specifies the content that the user wishes to instruct by an operation on the input section 2 (instruction content). In the case where it is distinguished that there is an operation instruction, the instruction content may be any type of information. In this example embodiment, the above-described instruction direction is specified by the instruction content. The instruction direction is a direction of the position of the input value with respect to a prescribed reference position on the coordinate plane. The prescribed reference position may be any position, and in this example embodiment, is the position of the origin. The instruction direction may be calculated by any method, and in this example embodiment, is calculated by, for example, the following method.

Figure 12:
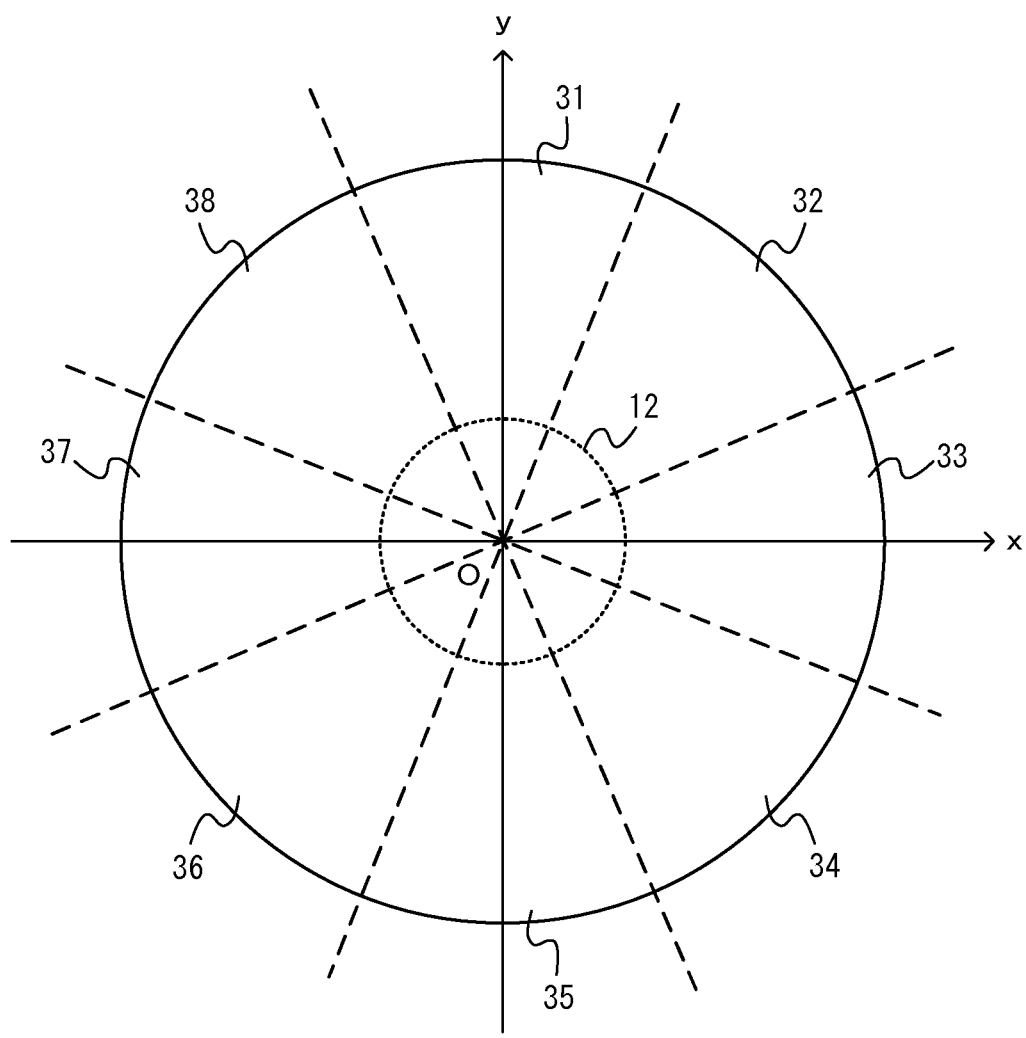
FIG. 12 shows a non-limiting example of an area which is set for calculating an instruction direction on the coordinate plane.

FIG. 12 shows an example of areas which are set in order to calculate the instruction direction on the coordinate plane. In this example embodiment, as shown in FIG. 12, a plurality of (eight in this example) areas 31 through 38 are set on the coordinate plane. Each of the areas 31 through 38 corresponds to an instruction direction which can be instructed. Specifically, a first area 31 corresponds to the upper direction, a second area 32 corresponds to the upper right direction, a third area 33 corresponds to the right direction, a fourth area 34 corresponds to the lower right direction, a fifth area 35 corresponds to the lower direction, a sixth area 36 corresponds to the lower left direction, a seventh area 37 corresponds to the left direction, and an eighth area 38 corresponds to the upper left direction. The CPU specifies a direction corresponding to an area including the input value, among the areas 31 through 38, as the instruction direction. In this manner, in this example embodiment, the user can instruct any of the eight types of directions as the instruction direction by use of the input section 2.

The instruction direction may be represented by any type of information. In other embodiment, the instruction direction may be represented by information representing an angle of the instruction direction (e.g., angle representing the direction of the input position with respect to the origin). The instruction content may include information representing the direction (instruction direction) and an amount regarding the direction as well as the information merely representing the direction. For example, information representing the instruction direction and the distance from the origin to the input value may be calculated as the instruction content.

Specifically in step S6, the CPU reads the input value data 22 from the memory, and calculates the instruction content based on the input value. Data representing the calculated instruction content is stored on the memory as the instruction content data 29. After step S6, the processing of step S7 is executed.

According to the processing of step S6, when it is distinguished that there is an operation instruction, the control section 3 calculates the direction of the position of the input value with respect to the prescribed reference position on the coordinate plane provided for representing the two-dimensional input value (calculates the instruction content). Accordingly, in this example embodiment, the user can instruct the direction by use of the input section 2 which allows a two-dimensional input operation to be made thereon. Specifically, the user can make an operation of moving the movable member from the reference state in a desired direction and thus instruct a direction in accordance with the moving direction. In addition, in this example embodiment, the responsiveness to the operation of instructing the direction by use of the input section 2 can be improved.

In step S7, the CPU executes prescribed application. Specifically, the CPU reads the instruction content data 29 from the memory, executes prescribed information processing using the instruction content as the input, and outputs data in accordance with the result of the execution (image output and/or sound output) to the output section 5. The application processing may be any type of processing which executes information processing using the instruction content as the input and outputs data in accordance with the result of the information processing. The application processing may be, for example, processing of moving a cursor displayed on a screen of a display device, which is the output section 5, in accordance with the instruction direction, or may be game processing of moving an object (game object) displayed on the screen of the display device in accordance with the instruction direction. In the case where, for example, the processing of moving the object (encompassing a cursor) displayed on the screen in accordance with the instruction direction is executed, the object can be moved with high responsiveness in accordance with the movement of the movable member of the input device. After step S7, processing of step S8 is executed.

In step S8, the CPU determines whether or not the information processing shown in FIG. 7 is to be terminated. The determination of step S8 is made based on, for example, whether or not the user has made an instruction to terminate the information processing, and/or whether or not a condition for terminating the information processing has been fulfilled in the application processing. When the determination result of step S8 is negative, the processing of step S2 is executed again. After this, until it is determined that the information processing is to be terminated, the CPU executes the series of processing of steps S2 through S8 repeatedly. By contrast, when the determination result of step S8 is positive, the CPU terminates the information processing shown in FIG. 7.

According to the information processing described above, the responsiveness of switching the state where there is an operation instruction to the state where there is no operation instruction, or vice versa, can be improved in the input device which allows an analog input to be made thereon. In this example embodiment, for example, a game (game program) which is originally intended to be played by a game operation using an input device which does not allow an analog input to be made thereon, such as a cross key or the like, can be applied to a game apparatus including an input device which allows an analog input to be made thereon, such as a slide pad, a touch panel or the like. Namely, in this example embodiment, the user can use a slide pad to play a game which is originally intended to be played by a game operation using a cross key.

[4. Modifications]

(Modification Regarding the Position of the Distinguishing Range)

In the above example embodiment, the distinguishing range is set to be a circular range centered around the origin. Namely, the position of the distinguishing range (central position of the distinguishing range) is fixed to the position of the origin. In other embodiments, the control section 3 may set the distinguishing range to be a circular area, such that when the input value is changed in a direction of being away from the border of the distinguishing range, the central position thereof is moved in a direction in accordance with the direction of change of the input value on the coordinate plane.

Figure 13:
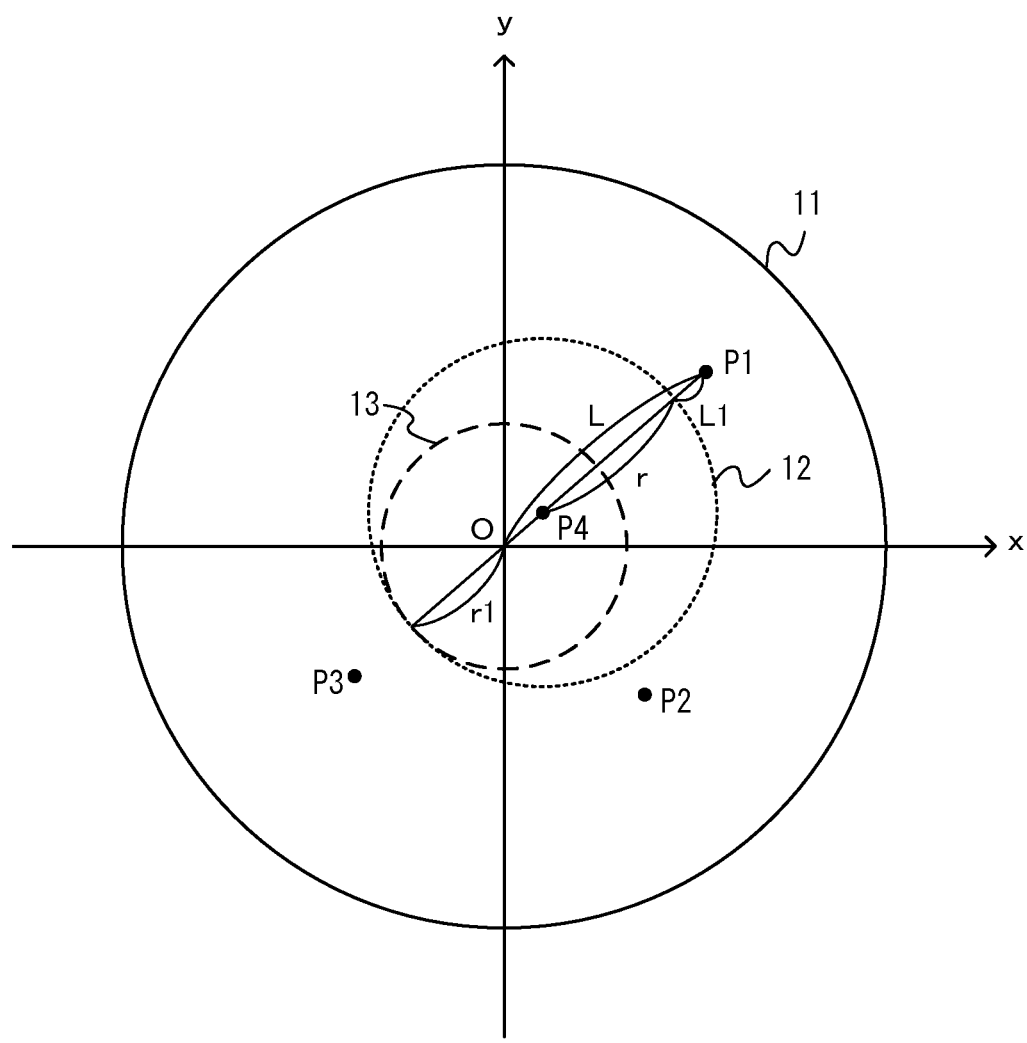
FIG. 13 shows a non-limiting example of the coordinate plane in the case where a distinguishing range is set such that a central position thereof is moved.

FIG. 13 shows an example of the coordinate plane in the case where the distinguishing range is set such that the central position thereof is movable as shown in FIG. 13. The distinguishing range 12 may be set such that when the distance between the input position P1 and the distinguishing range 12 is equal to or longer than the prescribed distance L1, a central position P4 thereof is moved in a direction of approaching the input position P1. Specifically, the control section 3 may set the distinguishing range 12 such that the central position P4 thereof is moved from a prescribed reference position (position of the origin) toward the input position P1. In this modification, as shown in FIG. 13, the distinguishing range 12 is set such that the central position P4 is located on a straight line connecting the input position P1 and the origin. In this modification, like in the above-described example embodiment, when the input value is changed in a direction of being away from the border of the distinguishing range, the distinguishing range is set such that the border is away from the post-change input position by a prescribed distance.

In this modification, like in the above-described example embodiment, the distinguishing range 12 may be set to include the lower limit range 13 (see FIG. 13). For example, the control section 3 may set the distinguishing range 12 such that the lower limit range 13 is inscribed to the distinguishing range 12.

Specifically, in this modification, in step S14, the CPU may calculate the distinguishing range as follows. First, where the distance from the origin to the input position P1 is L and the radius of the lower limit range is r1, the CPU calculates the radius r of the distinguishing range in accordance with the following expressions (1).

$$r=(L-L1+r1)/2 \text{ (when the input position } P1 \text{ is outside the distinguishing range 12)}$$

$$r=(L+L1+r1)/2 \text{ (when the input position } P1 \text{ is within the distinguishing range 12)} \qquad (1)$$

The central position of the distinguishing range is set on a straight line connecting the prescribed reference position (origin) and the input position. Namely, the CPU calculates the central position P4 of the distinguishing range as a position which is away from the origin toward the input position P1 by a length obtained by subtracting the radius r1 of the lower limit range from the radius r of the distinguishing range. In this modification, the CPU stores data representing the radius r and the central position P4 calculated in this manner on the memory as the distinguishing range data 26.

In the case where, as described above, the distinguishing range is set such that the central position thereof is moved in a direction in accordance with the change of direction of the input value, the distinguishing range is enlarged mainly in such a direction. Therefore, in the other directions, the ratio of enlargement is small (see FIG. 13). According to this, when the input direction is largely changed, the possibility that the post-change input position is included in the distinguishing range is low. For example, in FIG. 13, the input position P2 and the input position P3 (same as the input position P2 and the input position P3 in FIG. 10) are both outside the distinguishing range 12. Therefore, in this modification, even when the processing of reducing the distinguishing range based on the change of the input direction (steps S13 and S14) is not executed, the possibility of wrong distinguishing can be alleviated when the input direction is largely changed. In this modification, like in the above-described example embodiment, the CPU may or may not execute the processing of steps S13 and S14.

(Modification Regarding the Method for Changing the Distinguishing Range)

In the above-described example embodiment, when the input value is changed in a direction of being away from the border of the distinguishing range, the distinguishing range is set such that the border is away from the position of post-change input value by a prescribed distance. In other embodiments, the position of the border of the distinguishing range may be determined based on a reference point, which is set in accordance with the input position. Hereinafter, a modification in which the distinguishing range is set by use of a reference point will be described.

Figure 14:
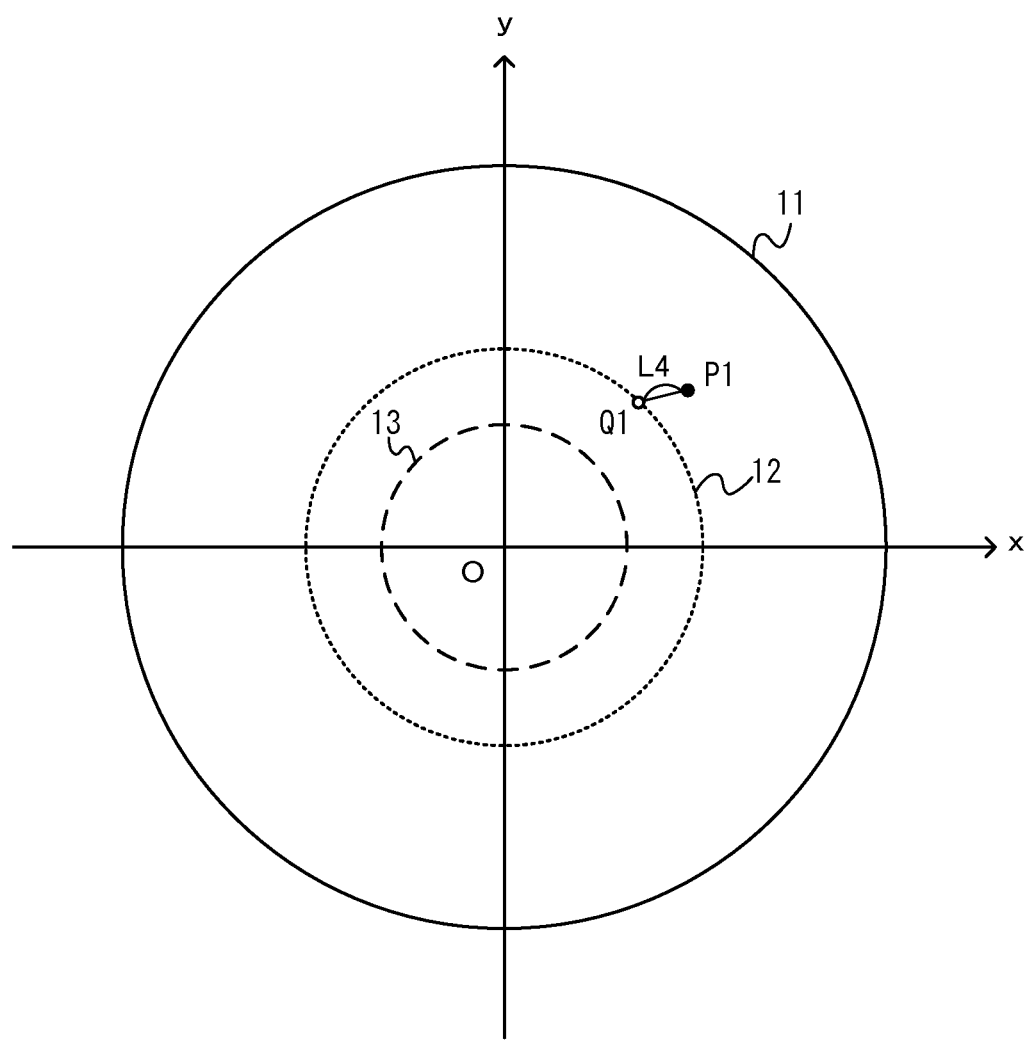
FIG. 14 shows a non-limiting example of the coordinate plane in the case where a distinguishing range is set based on a reference point.
Figure 15:
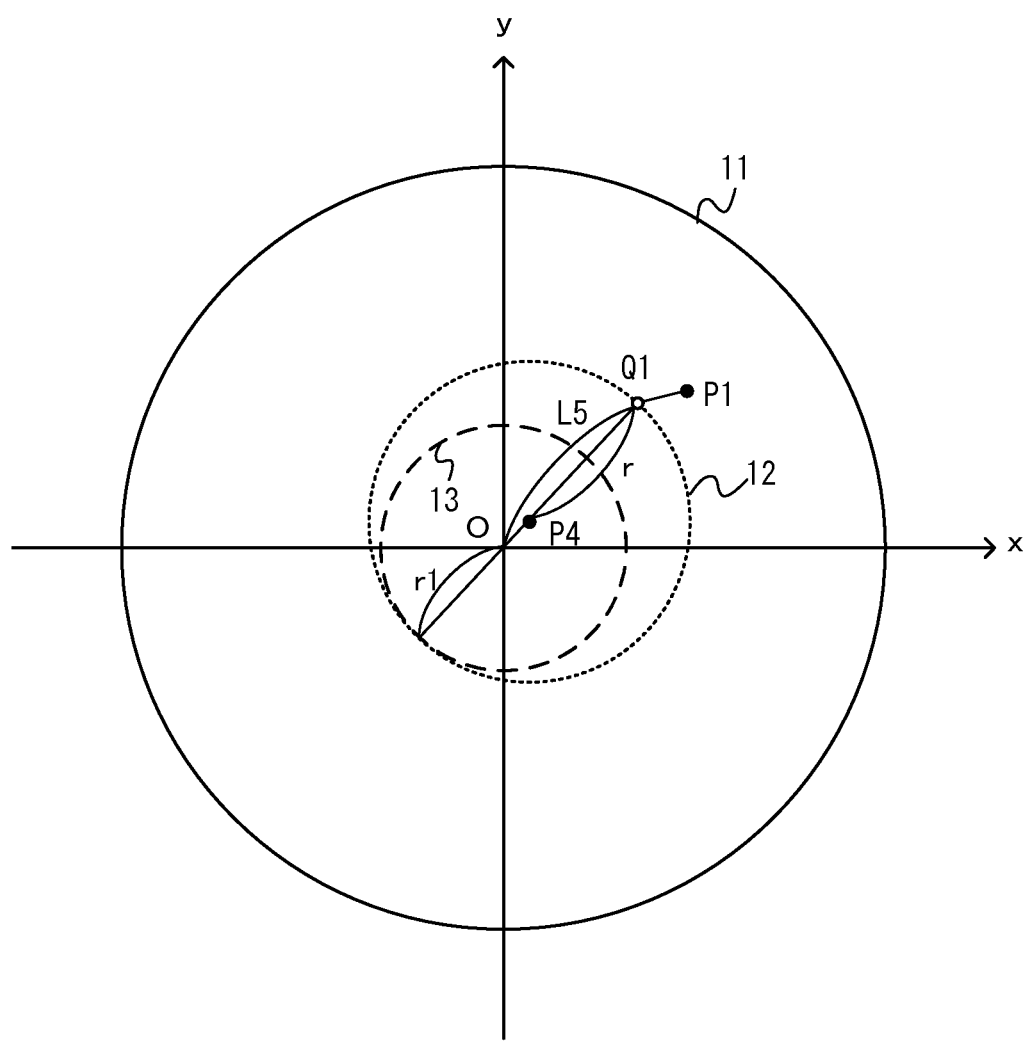
FIG. 15 shows a non-limiting example of the coordinate plane in the case where a distinguishing range is set based on the reference point.
Figure 16:
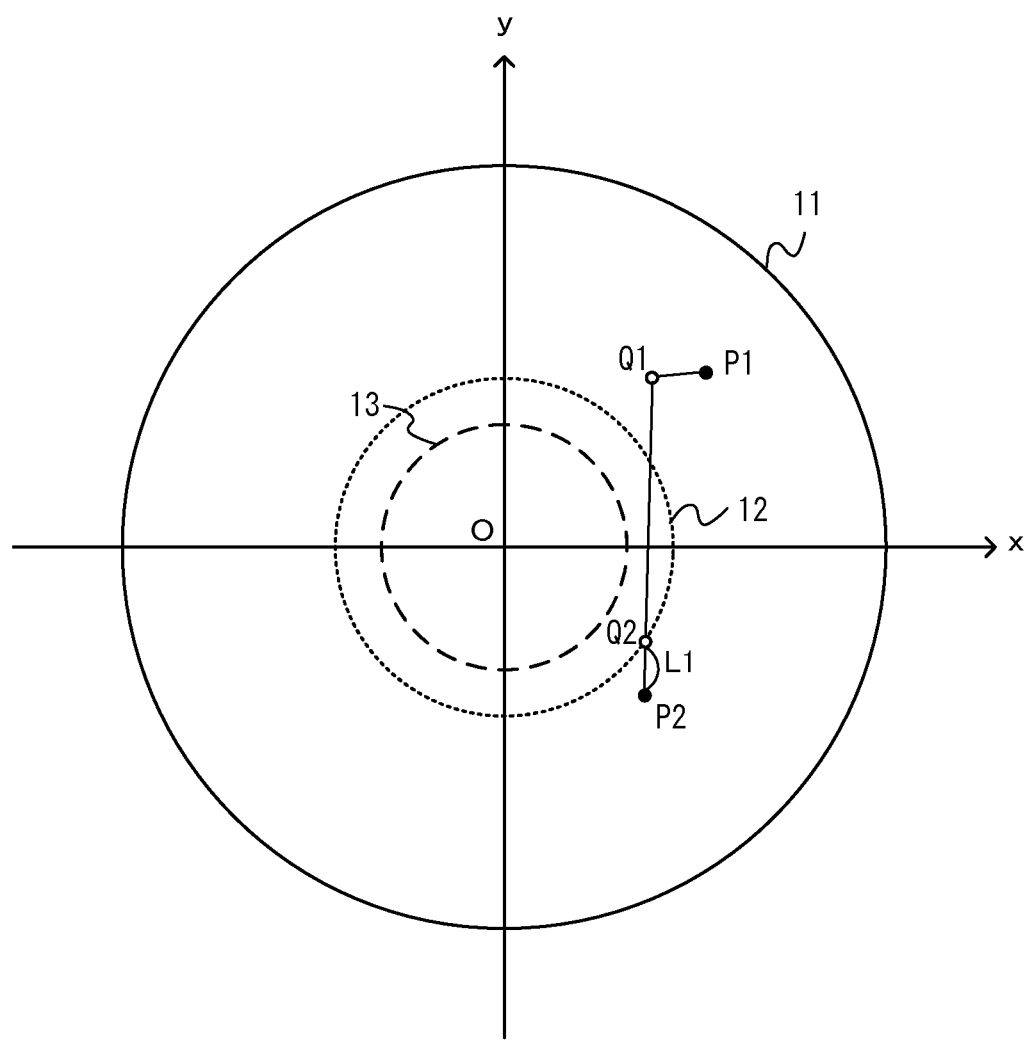
FIG. 16 shows a non-limiting example of the coordinate plane in the case where the input value is changed from the input position P1 to an input position P2.

FIG. 14 and FIG. 15 each show an example of the coordinate plane in the case where the distinguishing range is set based on a reference point. In FIG. 14 and FIG. 15, a reference point Q1 is a point, the position of which is set on the coordinate plane based on the input value. The control section 3 sets the reference point, such that when the input position P1 is changed in a direction of being away from the reference point Q1, the reference point is changed to approach the post-change input position P1. In this modification, the reference point is changed in accordance with the change of the input value so as to be within a prescribed distance from the input position. FIG. 16 shows an example of the coordinate plane in the case where the input value is changed from the input position P1 to the input position P2. In this case, as shown in FIG. 16, a reference point Q2 is set at a position which is on a light connecting the pre-change reference point Q1 and the post-change input position P2 and is away from the input position P2 by the prescribed distance L1.

In this modification, the distinguishing range 12 is set based on the reference point Q1. Specifically, the control section 3 determines the distinguishing range 12 such that the reference point Q1 is on the border thereof. The distinguishing range 12 may be set in any manner as long as the reference point Q1 is on the border of the distinguishing range 12. Specifically, as shown in FIG. 14, the distinguishing range 12 may be set to be centered around the origin O. Alternatively, as shown in FIG. 15, the distinguishing range 12 may be set such that the central position P4 thereof is moved in a direction of approaching the input position P1. In this modification, like in the above-described example embodiment, the distinguishing range 12 may be set to include the lower limit range (see FIG. 14 and FIG. 15). When the central position P4 is moved in a direction of approaching the input position P1, the control section 3 may set the distinguishing range 12 such that the lower limit range is inscribed to the distinguishing range 12.

In the case where, as in this modification, the distinguishing range is determined by use of a reference point which follows the input position, if the input direction is largely changed, the reference point is moved to a position inner to the post-change input position (a position closer to the origin). For example, when, as shown in FIG. 16, the input value is changed from the input position P1 to the input position P2 (same as the input position P2 shown in FIG. 10), the post-change reference point Q2 is set to a position inner to the input position P2. Accordingly, the distinguishing range 12 is set to be inner to the input position P2, and thus the distinguishing range 12 is reduced. Therefore, in this example embodiment, like in the above-described example embodiment, such a situation that it is distinguished that there is no operation instruction against the intention of the user can be prevented, and thus the operation instruction can be accurately distinguished.

FIG. 17 is a flowchart showing an example of range setting processing in this modification. In this modification, except for step S3, the processing may be the same as that in the above-described example embodiment. In this modification, in the initial processing of step S1, data representing the position of the origin is stored on the memory as the reference point data 27. Namely, in the initial state, the reference point is set to the position of the origin.

In this modification, in steps S21 and S22, the reference point is calculated so as to be within a prescribed distance from the input position. Specifically, in step S21, the CPU determines whether or not the distance between the input position and the position of the reference point is no less than the prescribed distance L1. The CPU reads the input value data 22 and the reference point data 27 from the memory, and calculates the distance. The CPU reads data representing the prescribed distance from the memory, and determines whether or not the calculated distance is no less than the prescribed distance L1. When the determination result of step S21 is positive, processing of step S22 is executed. By contrast, when the determination result of step S21 is negative, the processing of step S22 is skipped and processing of step S23 is executed.

In step S22, the CPU sets (moves) the reference point to be a position which is away from the input position by the prescribed distance. In this modification, the reference point is moved from the pre-change position toward the input position and is set at the position which is away from the input position by the prescribed distance (see FIG. 16). Specifically, where the input value is (ax, ay) and the distance between the input position and the position of the pre-change reference point is K, the position of the reference point (fx, fy) can be calculated in accordance with the following expressions (2).

$$fx = (L1/K) \times (fx - ax) + ax$$

$$fy = (L1/K) \times (fy - ay) + ay \quad (2)$$

The CPU reads the input value data 22 and the reference point data 27 from the memory, and calculates the position of the (post-change) reference point based on the input value and the pre-change reference point in accordance with the expressions (2). After step S22, the processing of step S23 is executed.

As described above regarding steps S21 and S22, when the position of the input value is changed in a direction of being away from the reference point (Yes in step S21), the control section 3 sets the reference point to be changed so as to approach the position of the post-change input value (step S22). When the input value is changed in a direction of approaching the position of the reference point, the control section 3 does not execute the processing of step S22, namely, maintains (does not change) the position of the reference point. Therefore, in this case, the position of the reference point is not changed, and thus the distinguishing range is not changed, either. As a result, when the input value keeps on approaching the border of the distinguishing range, the input value goes across the border, and thus the state where there is an operation instruction is switched to the state where there is no operation instruction, or vice versa.

Figure 18:
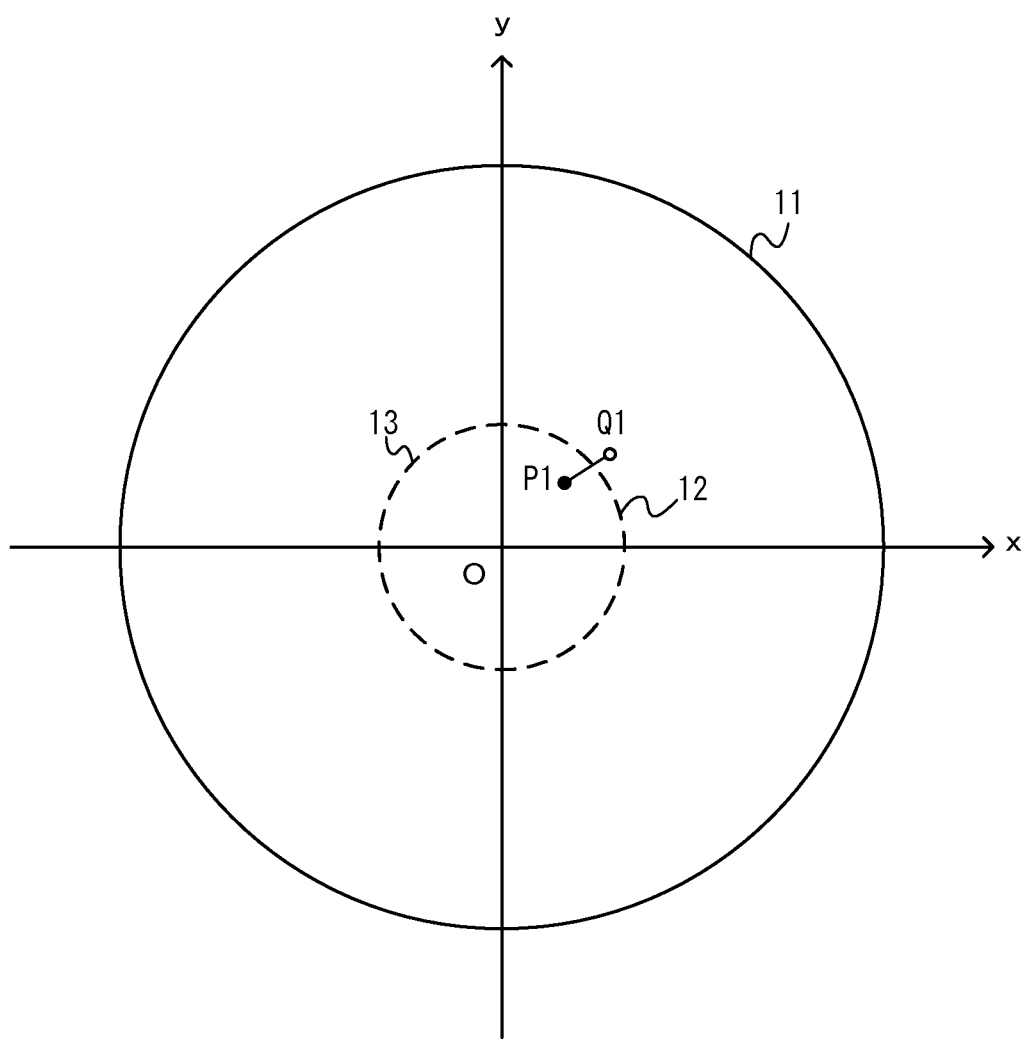
FIG. 18 shows a non-limiting example of the coordinate plane in the case where the input value is included in the lower limit range.

In this modification, like in the above-described example embodiment, the distinguishing range is set with the lower limit range being the lower limit. Specifically, in steps S23 through S25, when the input value is within the lower limit range, the CPU sets the distinguishing range to match the lower limit range. FIG. 18 shows an example of the coordinate plane in the case where the input value is included in the lower limit range. In FIG. 18, the input position P1 is included in the lower limit range 13. The reference Q1 set in step S22 is outside the lower limit range 13. In this modification, when the input position P1 is included in the lower limit range, the distinguishing range 12 is set to match the lower limit range 13 regardless of whether or not the reference Q1 is outside the lower limit range 13. Accordingly, in this modification, like in the above-described example embodiment, the distinguishing range does not becomes too small, and thus the user can easily provide the state where there is no operation instruction. Hereinafter, details of processing of steps S23 through S25 will be described.

In step S23, the CPU determines whether or not the input value is within the lower limit range. The processing of step S23 is substantially the same as the processing of step S11 in the above-described example embodiment. When the determination result of step S23 is positive, the processing of step S24 is executed. By contrast, when the determination result of step S23 is negative, processing of step S26 described later is executed.

In step S24, the CPU sets the distinguishing range to match the lower limit range. The processing of step S24 is substantially the same as the processing of step S12 in the above-described example embodiment. After step S24, the processing of step S25 is executed.

In step S25, the CPU sets the position of the reference point at the same position as the input position. Specifically, the CPU reads the input value data 22, and stores data representing the same value as the input value on the memory as the reference point data 27. Owing to this, in the processing loop to be executed immediately subsequently, the reference point is included in the lower limit range. Now, it is assumed that in the processing loop to be executed immediately subsequently, the input position is moved to a position slightly outside the lower limit range. In this case, if the reference point is outside the lower limit range, there is an undesirable possibility that the input value is located within the distinguishing range and thus it is determined that there is no operation instruction. By contrast, in this modification, the reference point is located within the lower limit range, and thus the distinguishing range is set to match the lower limit range (see steps S26 and S27 described later). Therefore, even when the input value is changed to a position slightly outside the distinguishing range (lower limit range), it is determined that there is an operation input. Therefore, the responsiveness of switching the state where there is no operation instruction to the state where there is an operation instruction can be further improved. After step S25, the CPU terminates the range setting processing.

Figure 19:
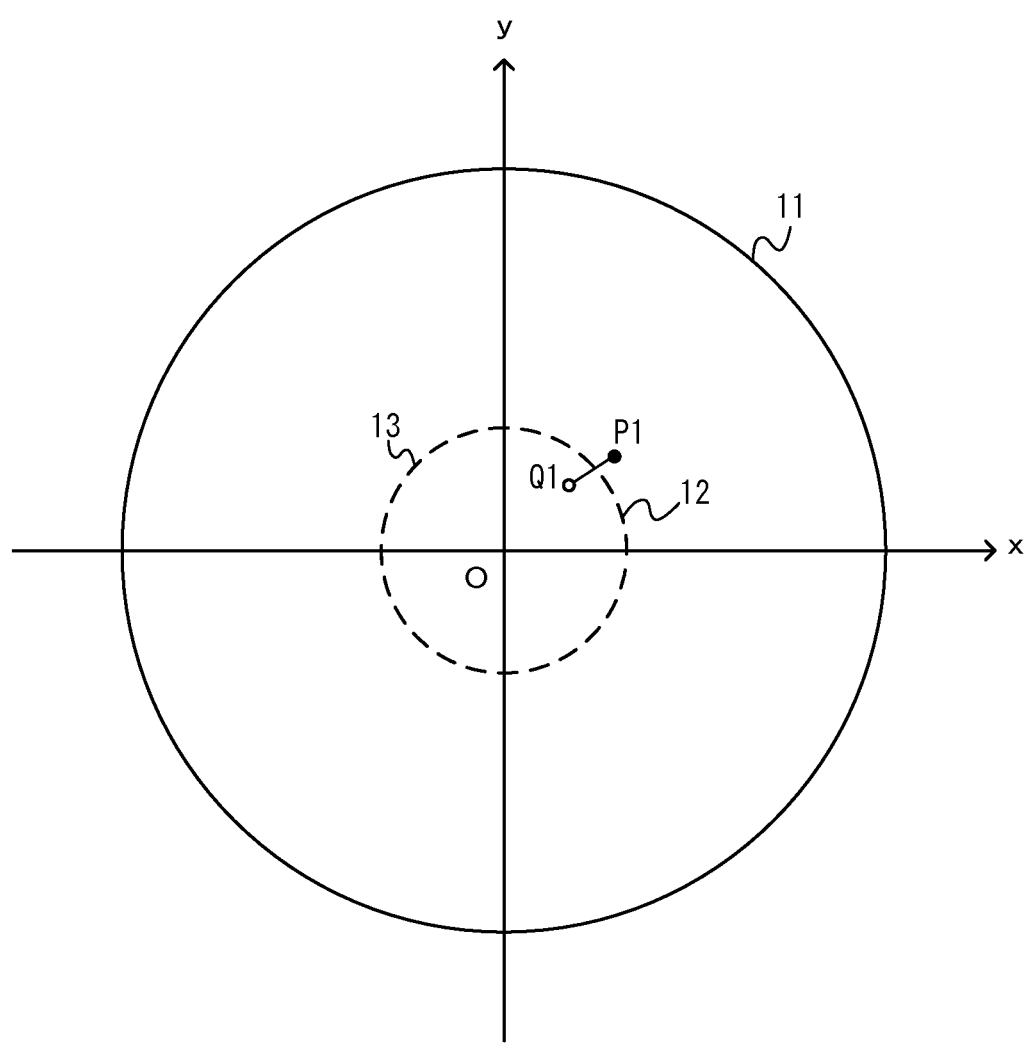
FIG. 19 shows a non-limiting example of the coordinate plane in the case where the reference point is included in the lower limit range.

In this modification, even when the reference point is included in the lower limit range, like when the input value is included in the lower limit range, the distinguishing range is set to match the lower limit range. Specifically, in steps S26 and S27, when the reference point is within the lower limit range, the CPU sets the distinguishing range to match the lower limit range. FIG. 19 shows an example of the coordinate plane in the case where the reference point is included in the lower limit range. In FIG. 19, the reference point Q1 is included in the lower limit range 13. The input position P1 is outside the lower limit range 13. In this modification, when the reference point Q1 is included in the lower limit range, the distinguishing range 12 is set to match the lower limit range 13. Accordingly, in this modification, like in the above-described example embodiment, the distinguishing range does not become too small, and thus the user can easily provide the state where there is no operation instruction. Hereinafter, details of processing of steps S26 and S27 will be described.

In step S26, the CPU determines whether or not the reference point is within the lower limit range. Specifically, the CPU reads the reference point data 27 and the lower limit range data 25 from the memory, and determines whether or not the reference point is within the lower limit range. When the determination result of step S26 is positive, the processing of step S27 will be described. By contrast, when the determination result of step S26 is negative, processing of step S28 described later will be described.

In step S27, the CPU sets the distinguishing range to match the lower limit range. The processing of step S27 is substantially the same as the processing of step S12 in the above-described example embodiment. After step S27, the CPU terminates the range setting processing.

As described above regarding steps S23 through S27, in this modification, when at least one of the input position and the reference point is within the lower limit range, the distinguishing range is set to match the lower limit range. Accordingly, in this modification, like in the above-described example embodiment, the distinguishing range does not become smaller than the lower limit range, and thus the user can easily provide the state where there is no operation instruction.

Figure 20:
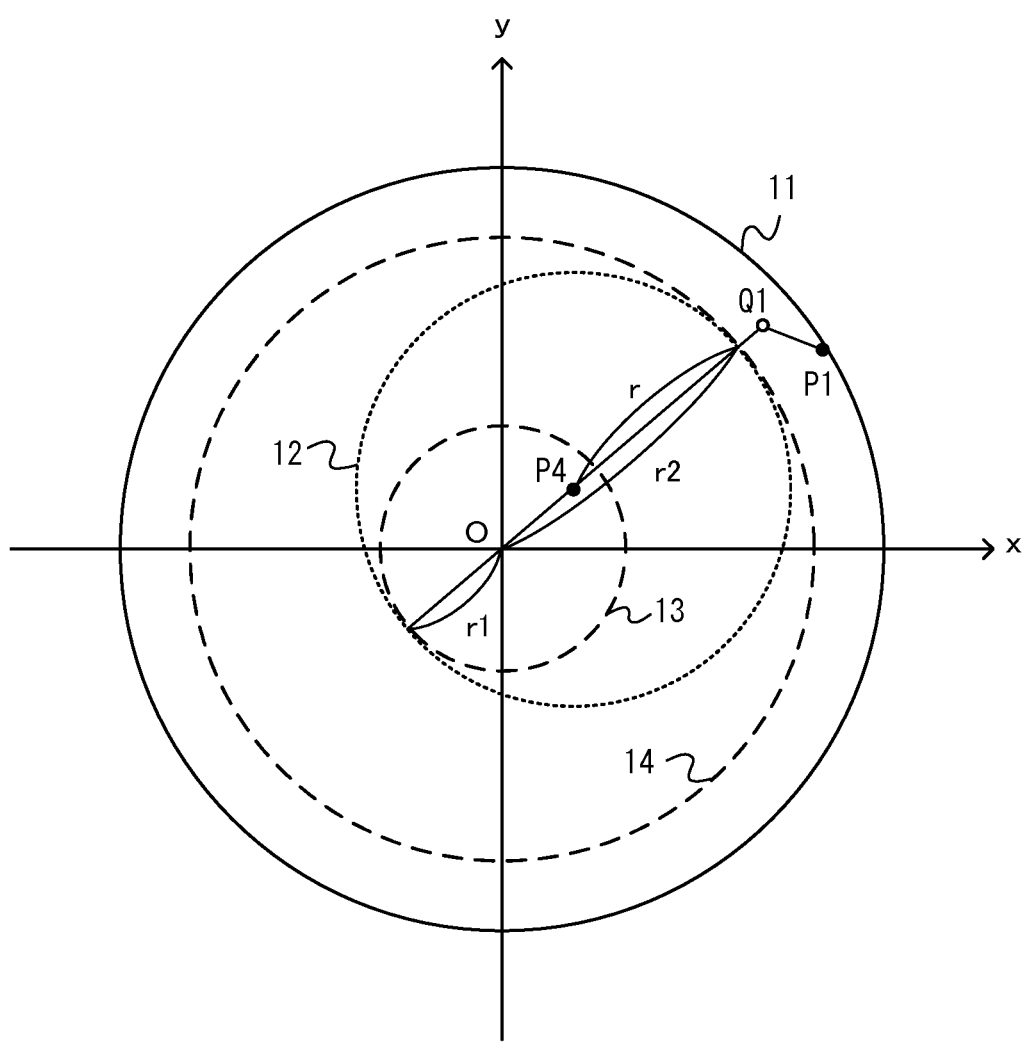
FIG. 20 shows a non-limiting example of the coordinate plane in the case where the reference point is included in an upper limit range.

In this modification, the upper limit range is predefined, and the distinguishing range is set with the upper limit range being the upper limit. Specifically, in steps S28 and S29, when the reference point is outside the upper limit range, the CPU sets the distinguishing range to match the upper limit range. FIG. 20 shows an example of the coordinate plane in the case where the reference point is outside the upper limit range. In FIG. 20, the input position P1 is outside the upper limit range (represented by reference numeral 14), and as a result, the reference point Q1 is also outside the upper limit range 14. In this modification, when the reference point Q1 is outside the upper limit range 14, as shown in FIG. 20, the distinguishing range 12 is set so as not to exceed the upper limit range 14 (such that the distinguishing range 12 is entirely included in the upper limit range 14). In this manner, in this modification, like in the above-described example embodiment, an upper limit can be set for the distinguishing range. In this modification, like in the above-described example embodiment, the distinguishing range does not become too large. Therefore, such a situation that it is distinguished that there is no operation instruction against the intention of the user can be prevented, and thus the operation instruction can be accurately distinguished. Hereinafter, details of processing of steps S28 and S29 will be described.

In step S28, the CPU determines whether or not the reference point is outside the upper limit range. Specifically, the CPU reads the reference point data 27 and the upper limit range data 28 from the memory, and determines whether or not the reference point is outside the upper limit range. When the determination result of step S28 is positive, the processing of step S29 is executed. By contrast, when the determination result of step S28 is negative, processing of step S30 described later is executed.

In step S29, the CPU sets the distinguishing range to be included in the upper limit range. For example, for setting the distinguishing range to be centered around the origin (FIG. 14) like in the above-described example embodiment, the distinguishing range is set to match the upper limit range. Specifically, the CPU stores data representing a range matching the upper limit range data 28 on the memory as the distinguishing range data 26.

For setting the distinguishing range such that the central position thereof is moved in a direction in accordance with the change of the input value (FIG. 15), the CPU sets the distinguishing range such that, for example, the distinguishing range is inscribed to the upper limit range and that the lower limit range is inscribed to the distinguishing range. Specifically, as shown in FIG. 20, the radius r of the distinguishing range 12 is a length obtained by dividing a sum of the radius r1 of the lower limit range 13 and a radius r2 of the upper limit range 14 by 2. The central position P4 of the distinguishing range 12 is calculated as a position which is away from the origin O toward the reference point Q1 by a distance obtained by subtracting the radius r1 of the lower limit range 13 from the radius r of the distinguishing range 12. Specifically, the CPU reads the lower limit range data 25 and the upper limit range data 28 from the memory, and calculates the radius r of the distinguishing range based on the radius of the lower limit range and the radius of the upper limit range. The CPU further reads the reference point data 27 from the memory, and calculates the central position P4 of the distinguishing range based on the position of the reference point Q1 and the radius r of the distinguishing range. The CPU stores data representing the radius r and the central position P4 calculated in this manner on the memory as the distinguishing range data 26. After step S29, the CPU terminates the range setting processing.

In step S30, the CPU sets the distinguishing range based on the reference point. In this modification, the distinguishing range is set such that the border thereof passes the reference point. For example, for setting the distinguishing range such that the origin is the center of the distinguishing range (FIG. 14) like in the above-described example embodiment, the radius of the distinguishing range is set to be equal to a length from the origin to the reference point. Specifically, the CPU reads the reference point data 27 from the memory, calculates the radius of the distinguishing range based on the position of the reference point, and stores data representing the calculated radius on the memory as the distinguishing range data 26.

For setting the distinguishing range such that the central position thereof is moved in a direction in accordance with the change of the input value (FIG. 15), the radius of the distinguishing range may be determined by, for example, the following method. Specifically, the radius r of the distinguishing range 12 can be calculated as a length obtained by dividing a sum of a length L5 from the origin to the reference point Q1 and the radius r1 of the lower limit range by 2 (see FIG. 15). The central position P4 of the distinguishing range 12 is calculated as a position which is away from the origin toward the reference point Q1 by a distance obtained by subtracting the radius r1 or the lower limit range 13 from the radius r of the distinguishing range 12. Thus, the CPU reads the lower limit range data 25 and the reference point data 27 from the memory, and calculates the radius r of the distinguishing range based on the radius of the lower limit range and the position of the reference point. The CPU further calculates the central position P4 of the distinguishing range based on the position of the reference point, the calculated radius, and the radius of the lower limit range. The CPU stores data representing the radius r and the central position P4 calculated in this manner on the memory as the distinguishing range data 26. After step S30, the CPU terminates the range setting processing.

As described above, in this modification, when the position of the input value is changed in a direction of being away from the reference point, the CPU sets the reference point to be changed to approach the position of the post-change input value (steps S21 and S22), and determines the distinguishing range such that the reference point is on the border of the distinguishing range (step S30). In this manner, the distinguishing range is determined, by use of a reference point which follows the input value, so as to be within a prescribed range from the input value, and as a result, when the input direction is largely changed, the distinguishing range is reduced (see FIG. 16). Accordingly, in this modification, like in the above-described example embodiment, such a situation that it is distinguished that there is no operation instruction against the intention of the user can be prevented, and thus the operation instruction can be accurately distinguished.

(Modification Regarding the Distinguishing Method in the Case where the Input Value is Two- or More Dimensional)

In the above-described example embodiment, the distinguishing range is set as an area of the same dimension as that of the input value (two-dimensional area). In other embodiments, in the case where the input value is two- or more dimensional, the control section 3 may set a (one-dimensional) distinguishing range for each component of the input value and determine whether or not each of the components of the input value is included in the distinguishing range. By contrast, in this example embodiment, the control section 3 acquires a two-dimensional input value representing a position on a plane and sets a distinguishing range 12 representing a two-dimensional area on the plane. Accordingly, in this example embodiment, it can be distinguished whether or not the input value is included in the distinguishing range at once, with no need of executing the distinguishing processing for each of the components. In the case where, as in this example embodiment, an instruction direction is to be calculated based on the input value, the instruction direction can be accurately calculated by use of the distinguishing range, which is a two-dimensional area. In the case where the input value is three-dimensional, the control section 3 may set a (one-dimensional) distinguishing range for each of the components of the input value or may set a distinguishing range as a three-dimensional spatial area.

(Modification in which a Touch Panel is Used)

In the above-described example embodiment, the input section 2 is an input device including a movable member such as a slide pad, an analog stick or the like. In other embodiments, the input section 2 may be a touch panel or a touch pad. In the case where the input section 2 is a touch panel, the reference position (origin) may be preset (in a fixed manner)

on an input screen, or may move in accordance with the input position. For example, when an image for operation (e.g., an image of a cross button) is displayed on the screen of the touch panel, a prescribed position in the image (central position of the cross button) may be the reference position.

The above-described example embodiment is usable as, for example, an information processing device or an information processing system such as a game device or the like, or an information processing program such as a game program or the like, in the case where an operation instruction is made by use of an input device, for the purpose of, for example, switching the state where there is an operation instruction to the state where there is no operation instruction, or vice versa, with high responsiveness.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having an information processing program stored thereon, the information processing program being executable by a computer of an information processing apparatus for distinguishing whether there is an operation instruction or not in accordance with an operation made on an input device, wherein the information processing program allows the computer to execute:
acquiring an input value based on the operation made on the input device;
distinguishing whether there is an operation instruction or not provided by the operation made on the input device, such that the distinguishing result is different between when the input value is within a distinguishing range, which is a prescribed range, and when the input value is outside the distinguishing range; and
when the input value is changed in a direction of being away from a border of the distinguishing range, changing a size of the distinguishing range such that the border approaches the post-change input value so as not to go across a position of the post-change input value;
wherein when the input value is changed in the direction of being away from the border of the distinguishing range:
in a case that the pre-change input value is inside the distinguishing range, the post-change input value is also inside the distinguishing range, and
in a case that the pre-change input value is outside the distinguishing range, the post-change input value is also outside the distinguishing range.

2. The storage medium according to claim 1, wherein the distinguishing range is set to include a prescribed set range.

3. The storage medium according to claim 2, wherein the prescribed set range includes an input value of a case where no operation is made on the input device.

4. The storage medium according to claim 1, wherein:
the input device includes a movable member which is operable by a user and is put to a prescribed state in a case where no operation is made thereon; and
an input value which is determined by a position and/or posture of the movable member with respect to the prescribed state is acquired.

5. The storage medium according to claim 1, wherein:
a two-dimensional input value is acquired; and
a distinguishing range representing a two-dimensional area on a coordinate plane provided for representing the two-dimensional input value is set.

6. The storage medium according to claim 5, wherein the distinguishing range is set as a circular area on the coordinate plane, the circular area being centered around a position of an input value of a case where no operation is made on the input device.

7. The storage medium according to claim 6, wherein when a direction from the central position of the circular area to the position of the input value is changed larger than a prescribed angle, the distinguishing range is changed to be reduced.

8. The storage medium according to claim 5, wherein when the input value is changed in a direction of being away from the border of the distinguishing range, the distinguishing range is set to be a circular area, a central position of which is moved in a direction in accordance with the direction of change of the input value.

9. The storage medium according to claim 5, wherein a reference point is set such that when a position of the input value is changed in a direction of being away from the reference point, the reference point is changed to approach a position of the post-change input value, and the distinguishing range is determined such that the reference point is on the border thereof, thereby setting the distinguishing range.

10. The storage medium according to claim 9, wherein when the input value is changed in a direction of approaching a position of the reference point, the position of the reference point is maintained.

11. The storage medium according to claim 1, wherein when the input value is changed in a direction of being away from the border of the distinguishing range, the distinguishing range is set such that the border thereof is away from a position of the post-change input value by a prescribed distance.

12. The storage medium according to claim 1, wherein when the input value is changed in a direction of approaching the border of the distinguishing range, the distinguishing range is maintained.

13. The storage medium according to claim 1, wherein when it is distinguished that there is the operation instruction, the computer is further allowed to execute calculating a direction of a position of the input value with respect to a prescribed reference position on the coordinate plane provided for representing a two-dimensional input value.

14. The storage medium according to claim 1, wherein when the input value outside the distinguishing range is changed in a direction of being away from the border of the distinguishing range, the distinguishing range is set to be enlarged.

15. The storage medium according to claim 14, wherein the distinguishing range is set such that an upper limit thereof is a range which is away from the border of a region of positions that the input value can assume by at least a prescribed distance.

16. The storage medium according to claim 1, wherein when the input value within the distinguishing range is changed in a direction of being away from the border of the distinguishing range, the distinguishing range is set to be reduced.

17. The storage medium according to claim 16, wherein the distinguishing range is set such that a lower limit thereof is a range which includes an input value of a case where no operation is made on the input device.

18. The storage medium according to claim 1, wherein when the input value is within the distinguishing range, it is distinguished that there is no operation instruction; and when the input value is outside the distinguishing range, it is distinguished that there is an operation instruction.

19. An information processing apparatus for distinguishing whether there is an operation instruction or not in accordance with an operation made on an input device, the information processing apparatus comprising:
- a computer processing system, comprising a computer processor, the computer processing system being configured to:
  - acquire an input value based on the operation made on the input device;
  - distinguish whether there is an operation instruction or not provided by the operation made on the input device, such that the distinguishing result is different between when the input value is within a distinguishing range, which is a prescribed range, and when the input value is outside the distinguishing range; and
  - change, when the input value is changed in a direction of being away from a border of the distinguishing range, a size of the distinguishing range such that the border approaches the post-change input value so as not to go across a position of the post-change input value;
  - wherein when the input value is changed in the direction of being away from the border of the distinguishing range:
    - in a case that the pre-change input value is inside the distinguishing range, the post-change input value is also inside the distinguishing range, and
    - in a case that the pre-change input value is outside the distinguishing range, the post-change input value is also outside the distinguishing range.

20. An information processing system for distinguishing whether there is an operation instruction or not in accordance with an operation made on an input device, the information processing system comprising:
- an input unit including the input device, the input unit configured to output an input value based on the operation made on the input device;
- a computer processing system, comprising a computer processor, the computer processing system being configured to:
  - distinguish whether there is an operation instruction or not provided by the operation made on the input device, such that the distinguishing result is different between when the input value is within a distinguishing range, which is a prescribed range, and when the input value is outside the distinguishing range; and
  - change, when the input value is changed in a direction of being away from a border of the distinguishing range, a size of the distinguishing range such that the border approaches the post-change input value so as not to go across a position of the post-change input value;
  - wherein when the input value is changed in the direction of being away from the border of the distinguishing range:
    - in a case that the pre-change input value is inside the distinguishing range, the post-change input value is also inside the distinguishing range, and
    - in a case that the pre-change input value is outside the distinguishing range, the post-change input value is also outside the distinguishing range.

21. An instruction distinguishing method executable by an information processing apparatus for distinguishing whether there is an operation instruction or not in accordance with an operation made on an input device, the instruction distinguishing method comprising:
- acquiring an input value based on the operation made on the input device;
- distinguishing, using a computer processor, whether there is an operation instruction or not provided by the operation made on the input device, such that the distinguishing result is different between when the input value is within a distinguishing range, which is a prescribed range, and when the input value is outside the distinguishing range; and
- when the input value is changed in a direction of being away from a border of the distinguishing range, changing a size of the distinguishing range such that the border approaches the post-change input value so as not to go across a position of the post-change input value;
- wherein when the input value is changed in the direction of being away from the border of the distinguishing range:
  - in a case that the pre-change input value is inside the distinguishing range, the post-change input value is also inside the distinguishing range, and
  - in a case that the pre-change input value is outside the distinguishing range, the post-change input value is also outside the distinguishing range.

22. A non-transitory computer-readable storage medium having an information processing program stored thereon, the information processing program being executable by a computer of an information processing apparatus for distinguishing whether there is an operation instruction or not in accordance with an operation made on an input device, wherein the information processing program allows the computer to execute:
- acquiring an input value based on the operation made on the input device;
- distinguishing whether there is an operation instruction or not provided by the operation made on the input device, such that the distinguishing result is different between when the input value is within a distinguishing range, which is a prescribed range, and when the input value is outside the distinguishing range;
- when the input value is changed in a direction of being away from a border of the distinguishing range, changing a size of the distinguishing range such that the border approaches the post-change input value; and
- when the input value is changed in the direction of being away from the border of the distinguishing range, changing the size of the distinguishing range such that the border approaches the post-change input value so as to increase input responsiveness as compared to not changing the size of the distinguishing range.

23. An information processing apparatus for distinguishing whether there is an operation instruction or not in accordance with an operation made on an input device, the information processing apparatus comprising:
- a computer processing system, comprising a computer processor, the computer processing system being configured to:
  - acquire an input value based on the operation made on the input device;
  - distinguish whether there is an operation instruction or not provided by the operation made on the input device, such that the distinguishing result is different between when the input value is within a distinguishing range, which is a prescribed range, and when the input value is outside the distinguishing range;

change, when the input value is changed in a direction of being away from a border of the distinguishing range, a size of the distinguishing range such that the border approaches the post-change input value; and change, when the input value is changed in the direction of being away from the border of the distinguishing range, the size of the distinguishing range such that the border approaches the post-change input value so as to increase input responsiveness as compared to not changing the size of the distinguishing range.

24. An information processing system for distinguishing whether there is an operation instruction or not in accordance with an operation made on an input device, the information processing system comprising:

an input unit including the input device, the input unit configured to output an input value based on the operation made on the input device;

a computer processing system, comprising a computer processor, the computer processing system being configured to:

distinguish whether there is an operation instruction or not provided by the operation made on the input device, such that the distinguishing result is different between when the input value is within a distinguishing range, which is a prescribed range, and when the input value is outside the distinguishing range;

change, when the input value is changed in a direction of being away from a border of the distinguishing range, a size of the distinguishing range such that the border approaches the post-change input value; and change, when the input value is changed in the direction of being away from the border of the distinguishing range, the size of the distinguishing range such that the border approaches the post-change input value so as to increase input responsiveness as compared to not changing the size of the distinguishing range.

25. An instruction distinguishing method executable by an information processing apparatus for distinguishing whether there is an operation instruction or not in accordance with an operation made on an input device, the instruction distinguishing method comprising:

acquiring an input value based on the operation made on the input device;

distinguishing, using a computer processor, whether there is an operation instruction or not provided by the operation made on the input device, such that the distinguishing result is different between when the input value is within a distinguishing range, which is a prescribed range, and when the input value is outside the distinguishing range;

when the input value is changed in a direction of being away from a border of the distinguishing range, changing a size of the distinguishing range such that the border approaches the post-change input value; and when the input value is changed in the direction of being away from the border of the distinguishing range, changing the size of the distinguishing range such that the border approaches the post-change input value so as to increase input responsiveness as compared to not changing the size of the distinguishing range.

* * * * *